(12) United States Patent
Fujiune et al.

(10) Patent No.: US 7,130,250 B2
(45) Date of Patent: Oct. 31, 2006

(54) OPTICAL HEAD AND OPTICAL DISK APPARATUS FOR PERFORMING FOCUS PULL IN

(75) Inventors: Kenji Fujiune, Takatsuki (JP); Yuichi Kuze, Settsu (JP); Kenji Kondo, Kadoma (JP); Shinichi Yamada, Katano (JP); Katsuya Watanabe, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 714 days.

(21) Appl. No.: 10/317,094

(22) Filed: Dec. 12, 2002

(65) Prior Publication Data

US 2003/0123344 A1    Jul. 3, 2003

(30) Foreign Application Priority Data

Dec. 14, 2001    (JP) ............................. 2001-381332

(51) Int. Cl.
*G11B 7/095*    (2006.01)
*G11B 7/00*    (2006.01)

(52) U.S. Cl. .............................. 369/44.27; 369/44.41; 369/53.28

(58) Field of Classification Search ..................... None
See application file for complete search history.

(56) References Cited

U.S. PATENT DOCUMENTS

| 5,831,952 | A * | 11/1998 | Yamada et al. | ........... 369/44.27 |
| 6,246,647 | B1 * | 6/2001 | Tsutsui et al. | ........... 369/44.29 |
| 6,314,065 | B1 * | 11/2001 | Akkermans | ............... 369/44.25 |
| 6,721,244 | B1 * | 4/2004 | Kubota | ..................... 369/44.27 |

FOREIGN PATENT DOCUMENTS

| JP | 52-80802 | 7/1977 |
| JP | 11-120569 | 4/1999 |
| JP | 2000-20969 | 1/2000 |

* cited by examiner

*Primary Examiner*—Andrea Wellington
*Assistant Examiner*—Nathan Danielsen
(74) *Attorney, Agent, or Firm*—Wenderoth, Lind & Ponack, L.L.P.

(57) ABSTRACT

An optical disk apparatus includes an optical detector which has light receiving areas divided nearly concentrically with an optical beam and outputs a signal corresponding to the amount of the reflected light from an optical disk. A surface vicinity detecting section adds up signals from all the light-receiving areas of the optical detector and outputs a detection signal. The detection signal continuously varies so as to have one maximum level while a beam spot of the optical beam moves from the surface of the information medium to the information plane. An information plane detecting section judges that the focus or the beam spot of the optical beam comes closer to the information plane of the optical disk by detecting the gradient of the detection signal. An approach of a condensing lens and the optical disk is judged based on the judgment results, and thus a collision of the condensing lens and the optical disk can be prevented.

8 Claims, 18 Drawing Sheets

91 RECORDING LAYER

91a RECORDING LAYER
93 SEMI-TRANSPARENT LAYER
91b RECORDING LAYER
95 REFLECTION FILM

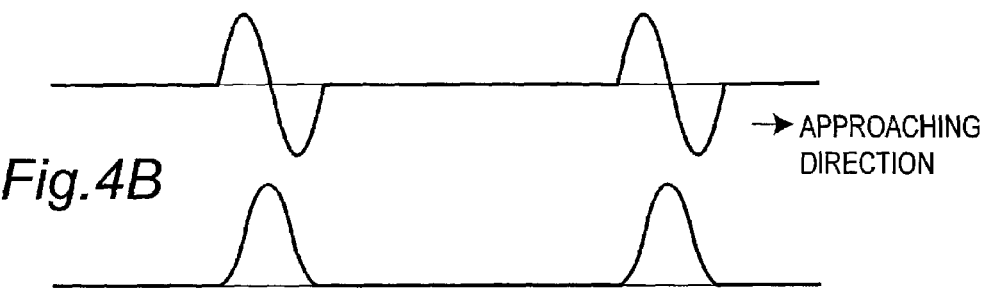
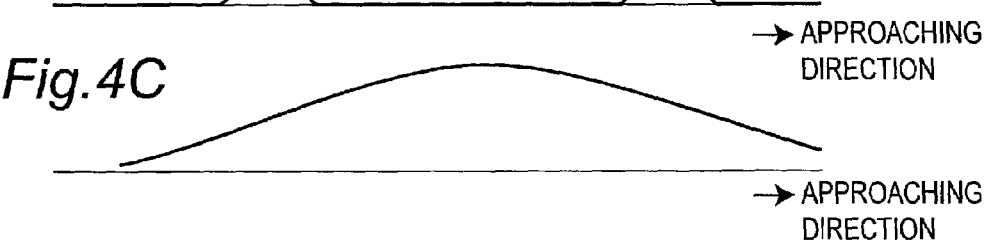
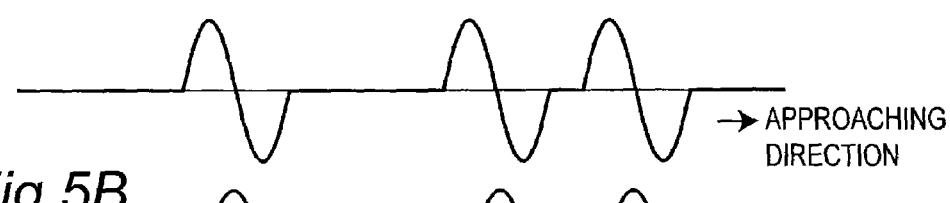

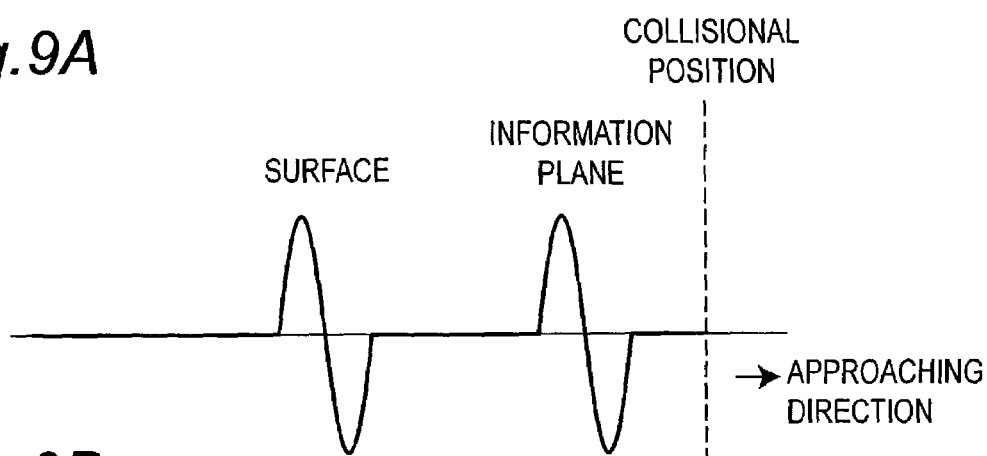
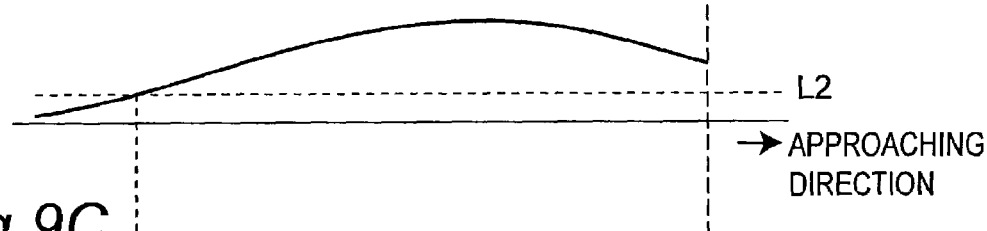

1 CYCLE OF MOTOR

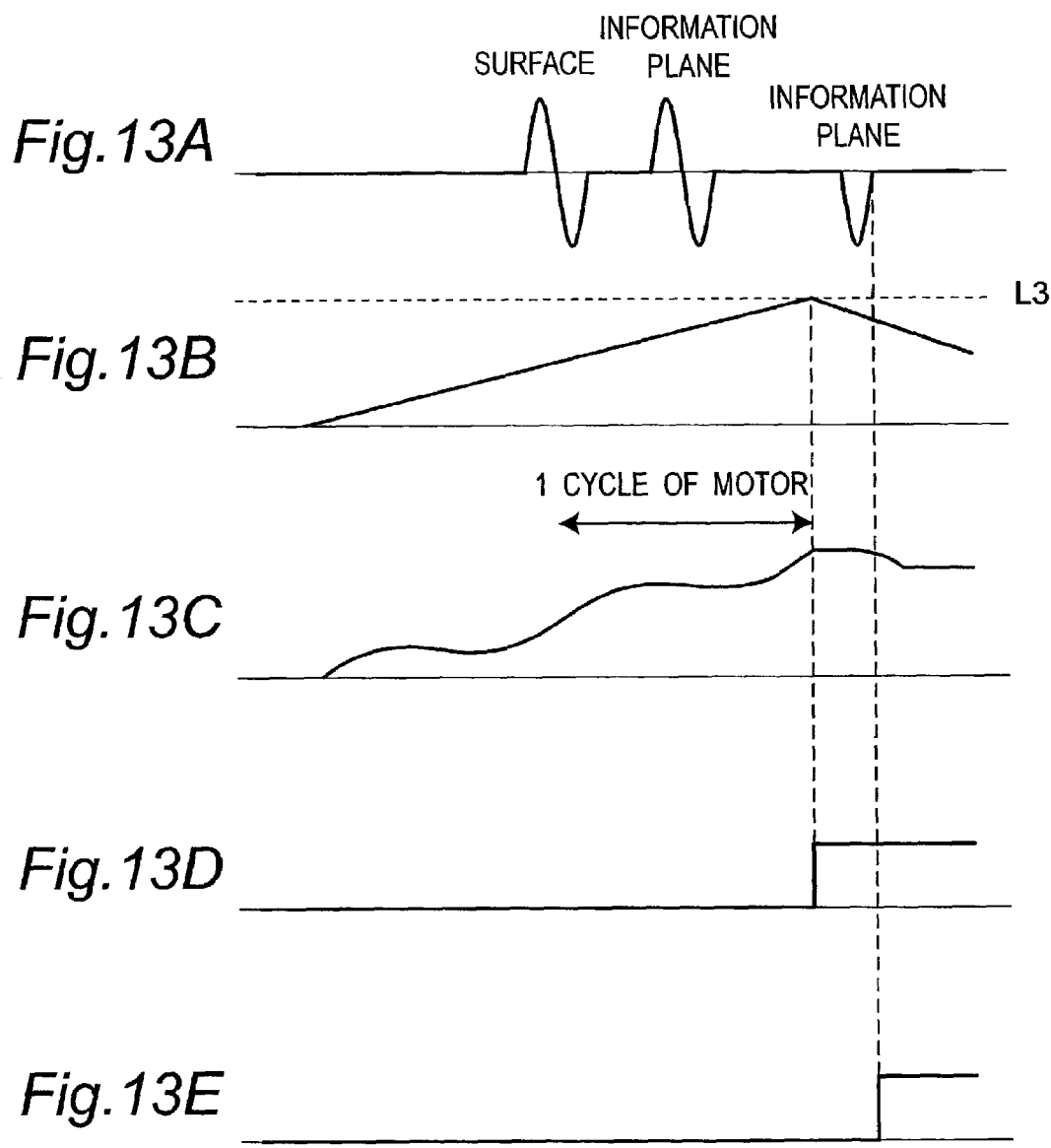

OPTICAL HEAD AND OPTICAL DISK APPARATUS FOR PERFORMING FOCUS PULL IN

BACKGROUND OF THE INVENTION

1. Field of the Invention

The present invention relates to an optical head and optical disk apparatus for recording to or reproducing from a rotating disk-form information medium (hereinafter called the "optical disk"), and in particular, relates to an optical head and optical disk apparatus which carry out focus pull in action without causing collisions between optical disk and condensing lens for collecting optical beams when recording or reproduction (playback) is carried out.

2. Description of Related Art

In a conventional optical disk apparatus, when signals are reproduced, the optical disk is irradiated with an optical beam of comparatively weak specified light amount and the reflected light modulated strongly or weakly by the optical disk is detected. In addition, when signals are recorded, the light amount of optical beams is modulated strongly or weakly in accordance with signals recorded and information is recorded in a recording material film on the optical disk. This is described in, for example, Japanese Laid-Open Patent Publication No. 52-80802, etc.

The read only optical disk records the information on pits recorded in advance in the form of a spiral. In addition, the optical disk which can be recorded and can be reproduced has optically recordable and reproducible material film formed on the substrate surface with spiral-form track of patterned indented structure by techniques such as evaporation. In order to record information on the optical disk or to reproduce information recorded, focus control is required to control optical beam in the direction normal to the optical disk surface (hereinafter called the "focus direction") so that optical beams achieve constantly the specified convergence condition on the recording material film.

Referring now to FIG. 17A, a control of conventional optical disk will be described. Optical head 10 is provided with semiconductor laser 11, coupling lens 12, polarizing beam splitter 13, ¼ wavelength plate 14, condensing lens 15, focus actuator which is a focus moving means (hereinafter called the "Fc actuator") 16, tracking actuator (hereinafter called the "Tk actuator"), detection lens 18, cylindrical lens 19, and optical detector 20.

The optical beam generated from the semiconductor laser 11 is made into parallel beam by the coupling lens 12, passes the polarizing beam splitter 13 and the ¼ wavelength plate 14, and is converged onto the optical disk 1 by condensing lens. The optical beam reflected against it again passes the condensing lens 15 and ¼ wavelength plate 14, is reflected at the polarizing beam splitter 13, passes the detection lens 18 and the cylindrical lens 19, and is applied to the optical detector 20 with a light receiving section divided into four. The condensing lens 15 is supported by elastic material such as springs, When the Fc actuator 16 is energized, the condensing lens 15 moves to a direction substantially perpendicular (focus direction) to the optical disk 1 by electromagnetic force. The optical detector 20 which has a light receiving section divided into four sends each light amount signal detected to the focus error generator 30 (hereinafter called the "FE generator 30").

By using each light amount single from a light receiving section divided into tour, the FE generator 30 obtains error signal (hereinafter called the "FE signal") that indicates the converging condition of the optical beam on the information plane of the optical disk 1 and sends it to the Fc actuator 16 via the focus control filter 31 (hereinafter called the "Fc filter"), the drive signal selector 32, and the focus drive 33 (hereinafter called the "Fc driver"). In addition, the FE generator 30 sends the FE signal to a pull in signal generator 71.

FIG. 17B is a diagram showing a light receiving section of the optical detector 20. As shown in the figure, the optical detector has four light receiving sections 201a through 201d. Because the astigmatism is generated due to a cylindrical lens, if the condensing lens 15 moves in the direction that approaches the optical disk 1, the focus of the optical beam on the optical detector 20 becomes ellipse elongated in directions of a light receiving section 201a and a light receiving section 201c. In the event that the condensing lens 15 moves in the direction separating from the optical disk 1 with respect to the focalized point, the focus of the optical beam on the optical detector 20 becomes ellipse elongated in directions of a light receiving section 201b and a light receiving section 201d. FE generator 30 generates the FE signal by calculating the difference between the light amount sum in light receiving section 201a and light receiving section 201c and light amount sum in light receiving section 201b and light receiving section 201d. This technique is called "an astigmatism method". The Fc actuator 16 drives the condensing lens 15 in the focus direction so that the optical beam converges on information plane of the optical disk 1 in the specified condition. Focus control is done as described above.

Search-driving generator 64 which is a means for generating search driving operation generates a drive signal for driving the Fc actuator 16 in the approaching direction or separating direction at a specified speed. The search-driving generator 64 sends a signal to the Fc actuator 16 via the drive signal selector 32 and the Fc driver 33. The signal from the optical detector 20 are sent to the reflected light amount detector 70. The reflected light amount detector 70 operates sum signals from all the light receiving sections of the optical detector 20 and sends the summed signal to the pull in signal generator 71. The pull in signal generator 71 sends a low-level signal to the drive signal selector 32 when the signal from the reflected light amount detector 70 is greater than the specified level L1 and until the FE signal from the FE generator 30 passes the reference level from positive to negative. Thereafter, pull in signal generator 71 sends high-level signals to drive signal selector 32. Drive selector 32 sends a signal from the Fc filter 31 which is a focus control driving means to FC driver 33 when the signal from pull in signal generator 71 is of a high level, or sends the signal from the search-driving generator 64 to the Fc driver 33 when the signal from the pull in signal generator 71 is of a low level. The Fc driver 33 drives the Fc actuator 16 based on the signal selected by the drive signal selector 32.

Referring now to FIGS. 18A and 18B, description will be made on FE signal from the FE generator 30 and signals from the reflected light amount detector 70, which are detection signals. FIG. 18A is a diagram showing one example of FE signal output from the FE generator 30 and FIG. 18B is a diagram that shows one example of output signal from the reflected light amount detector 70. The abscissa of FIG. 18 is the relative position in the focus direction of the optical disk 1 and the condensing lens 15 and is an approaching direction from left to right in the figure. In addition, the ordinates of FIG. 18A and 18B show the respective signal level. As shown in FIG. 18A, the FE signal from the FE generator 30 is positive in the separating direction from the focalized point and negative in the approaching direction. As shown in FIG. 18B, the signal from the reflected light amount detector 70 becomes cone-shaped signals in the detection range nearly same as that of the FE signal.

Referring now to FIGS. 19A through 19D, the focus pull in operation is described. FIG. 19A is a diagram showing one example FE signal output from the FE generator 30, FIG. 19B is a diagram showing one example of an output signal from the reflected light amount detector 70, FIG. 19C is a diagram showing one example of an output signal from the drive signal selector 32, and FIG. 19D is a diagram showing one example of an output signal from the pull in signal generator 71. The abscissa of each of FIG. 19A through FIG. 19D shows a time, and the ordinate shows a level of the respective signal. The polarity of the signal from the drive signal selector 32 required for condensing lens 15 to move in the approaching direction to optical disk 1 is positive in FIG. 19C. As shown in FIG. 19D, because the signal from pull in signal generator 71 is of a low level at the start of focus pull in, the drive signal selector 32 sends the signal from the search-driving generator 64 to the Fc driver 33. As shown in FIG. 19C, the search-driving generator 64 generates driving operation so that the condensing lens 15 moves in the direction for approaching the optical disk 1 from the condition in which the optical disk 1 and the condensing lens 15 are sufficiently separated. When the focus of optical beams approaches a focalized point on the information plane of the optical disk 1, as shown in FIG. 19A and FIG. 19B, a change occurs in the FE signal from the FE generator 30 and a signal from the reflected light amount detector 70.

The pull in signal generator 71 makes a signal to drive signal selector 32 to a high level when the signal level from the reflected light amount detector 70 exceeds L1 and the FE signal from the FE generator 30 crosses the reference level from positive to negative. Thereafter, the signal from the Fc filter 31 is selected by the drive signal selector 32 and focus control is brought into an active condition (an operating condition).

In recordable optical disk 1, recording action is carried out by absorbing optical beam with which the information plane of the optical disk is irradiated, that is, by changing the phase of recording material by heat accumulated by the absorption. Consequently, the absorption ratio of information plane of the optical disk 1 must be increased to improve a recording speed, and in such event, the reflectivity tends to lower. Furthermore, since in the optical disk which has a plurality of information planes for improved recording capacity, the information planes on the far side as seen from condensing lens 15 must be irradiated with optical beams, transmittance on the information plane on the near side as seen from condensing lens must be increased. That is, the reflectivity of the information plane of the optical disk tends to lower as the recording capacity and recording speed are improved. In addition, the reflected signal of the optical beam occurs not only from the information plane of the optical disk but also from the surface of the optical disk. Because when the reflectivity in the information plane of the optical disk 1 lowers to the level equivalent to the reflectivity at the surface of the optical disk, the FE signal from the FE generator 30 and the signal from the reflected light amount detector 70 begin to have same waveforms on the surface and the information plane of the optical disk 1, they are unable to be distinguished during focus pull in operation, and the focus control is carried out to the surface of optical disk 1. As a result, a problem of long time required for irradiating the desired address with optical beams occurs.

Furthermore, a beam spot of the optical beam must be made smaller in order to improve recording density of the optical disk 1. In general, achieving a small beam spot by shortening the focal length of condensing lens 15 shortens the distance from a focalized point on the information plane to colliding position and increases the possibility of collision between the condensing lens 15 and the optical disk 1. Consequently, a means to solve the problem for the equivalent reflectivity on the information plane and the surface of optical disk is proposed by carrying out focus pull in operation while the beam spot of the optical beam is kept away from the optical disk 1 after the condensing lens 15 is moved in such a manner that the beam spot of the optical beam is located on the optical disk 1 side rather than on the information plane of the optical disk. However, in the case that the distance from the focalized point on the information plane to the colliding position is smaller than the face-runout of the optical disk 1, it is impossible to bring the condensing lens 15 to the optical disk 1 from the information plane focalized point without collision and thus there is a big problem of inevitably damaging optical disk 1.

SUMMARY OF THE INVENTION

The present invention is aimed to solve the above-mentioned problems and it is the object of the present invention to provide an optical head and optical disk apparatus with high reliability, which avoids collision between the condensing lens and the optical disk and prevents damage to the condensing lens and the optical disk, in the case that the beam spot of the optical beam and the optical disk surface come extremely close to each other or that the reflectivity of information plane lowers to become equivalent to the surface reflectivity.

An optical disk apparatus according to the present invention has a light receiving area divided substantially concentrically, receives a reflected light from an information medium, and detects amount of the reflected light from the information medium using an optical detector that outputs a signal corresponding to amount of the reflected light. From signals from such optical detector, obtained is a signal that continuously varies so as to have one maximum point while a beam spot of the optical beam moves from the surface to the information plane of the information medium. Consequently, by considering this detection signal, it is possible to learn the positional relationship between the beam spot of the optical beam, and a surface or a information plane of the information medium. For example, when the gradient (changing rate) of such a detection signal is detected and the gradient becomes negative, it is possible to judge that the beam spot of the optical beam comes close to the information plane of information medium. In addition, since the beam spot of the optical beam corresponds to the position of the condensing lens, the signal level of such detected signal may be compared with a specified level. If the signal level of the detection signal exceeds the specified level, it is possible to judge that the condensing lens comes close to the surface of the information medium. Using the judgement results as mentioned above, it is possible to avoid a collision between the condensing lens and the information medium with high accuracy.

The first optical disk apparatus according to the present invention records or reproduces data to or from a rotating information medium which has at least one information plane. The apparatus includes: a converging section operable to converge an optical beam to irradiate the converged beam onto the rotating information medium, a focus moving section operable to move the converging section in a direction normal to the information plane of the information medium, an optical detection section having a light receiving area divided substantially concentrically into plural areas, and being operable to receive reflected light from the information medium and output a signal corresponding to the amount of the reflected light, a plane vicinity detecting section operable to generate a vicinity detection signal based on a signal from the optical detection section, the vicinity detection signal continuously varying so as to have one maximum point while a beam spot of the optical beam moves from the surface to the information plane of the information medium, a search driving section operable to generate a driving signal for approximating or separating the beam spot of the optical beam with respect to the information medium, a focus error detecting section operable to generate a signal corresponding to an error of a focus position of the optical beam with respect to the information plane or the surface of the information medium, a focus control driving section operable to generate a signal for driving the focus moving section so that the beam spot of the optical beam follows the information plane of the information medium in accordance with the signal from the focus error detecting section, an information plane determining section operable to determine whether or not a beam spot of the optical beam (the focus position) is located in the vicinity of the information plane of the information medium based on signals from the plane vicinity detecting section and the focus error detecting section, and a focus pull in section operable to select and supply either of the signal from the focus control driving section or the signal from the search driving section to the focus moving section in accordance with a signal from the information plane determining section.

The second optical disk apparatus according to the present invention records or reproduces data to or from a rotating information medium which has at least one information plane. The apparatus includes converging a section operable to converge an optical beam to irradiate the converged beam onto the rotating information medium, a focus moving section operable to move the converging section in a direction normal to the information plane of the information medium, an optical detection section having a light receiving area that is divided substantially concentrically into plural areas, the optical detection section being operable to receive a reflected light from the information medium and output a signal corresponding to the amount of the reflected light, a plane vicinity detecting section operable to generate a vicinity detection signal based on the signal from the optical detection section, the vicinity detection signal continuously varying so as to have one maximum point while a beam spot of the optical beam moves from the surface to the information plane of the information medium, and an avoidance drive generating section operable to generate a driving signal for separating the converging section from the information medium in accordance with the signal from the plane vicinity detecting section.

The third optical disk apparatus according to the present invention records or reproduces data to or from a rotating information medium which has at least one information plane. The apparatus includes a converging section operable to converge an optical beam to irradiate the converged beam onto the rotating information medium, a focus moving section operable to move the converging section in a direction normal to the information plane of the information medium, focus error detecting section operable to generate a signal corresponding to an error of a focus position of the optical beam with respect to the information plane or the surface of the information medium, a focus control driving section operable to generate a signal for driving the focus moving section so that a beam spot of the optical beam follows the information plane of the information medium in accordance with the signal from the focus error detecting section, a face-runout storage section operable to store an amount of face-runout corresponding to the rotating phase of the information medium and generate a driving output in accordance with the stored face-runout amount, a face-runout signal applying section operable to add the signal from the face-runout storage section to the signal from the focus control driving section, a search driving section operable to generate a driving signal for approximating or separating the focus of the optical beam with respect to the information medium to the focus moving section and output the driving signal, and a focus pull in section operable to select and output either of the signal from the face-runout signal applying section or the signal from the search driving section in accordance with the signal from the focus error detecting section.

An optical head according to the present invention includes a converging section operable to converge an optical beam to irradiate the converged beam onto a rotating information medium which has at least one information plane, a focus moving section operable to move the converging section in a direction normal to the information plane of the information medium, an optical detection section having a light receiving area divided substantially concentrically into plural areas, the optical detection section being operable to receive a reflected light from the information medium and output a signal corresponding to an amount of the reflected light; and a plane vicinity detecting section operable to generate a vicinity detection signal based on the signal from the optical detector, the vicinity detection signal continuously varying so as to have one maximum point while a beam spot of the optical beam moves from the surface to the information plane of the information medium. The plane vicinity detecting section is operable to output a signal which is a sum of signals from all the divided areas of the optical detection section.

BRIEF DESCRIPTION OF THE DRAWINGS

These and other object and features of the present invention will become clear from the following description taken in conjunction with the preferred embodiments thereof with reference to the accompanying drawings, in which:

FIG. 4A is a diagram showing one example of an output of FE generator in the first embodiment, FIG. 4B is a diagram showing one example of an output signal from the reflected light amount detector in the first embodiment, and FIG. 4C is a diagram showing one example of an output signal of a plane vicinity detector signal in the first embodiment (those for a single-layer optical disk);

FIG. 5A is a diagram showing one example of an output of FE generator in the first embodiment FIG. 5B is a diagram showing one example of an output signal of a reflected light amount detector in the first embodiment, and FIG. 5C is a diagram showing one example of an output of a plane vicinity detector in the first embodiment (those for a dual layer optical disk);

FIG. 9A is a diagram showing one example of an output of the FE generator in the second embodiment, FIG. 9B is a diagram showing one example of an output of the plane vicinity detector in the second embodiment, and FIG. 9C is a diagram showing one example of an output of the internal signal of the estrangement-drive driving generator in the second embodiment;

FIG. 13A is a diagram showing one example of an output of FE generator when a focus pull in operation is carried out in the third embodiment, FIG. 13B is a diagram showing one example of an output of the search driving generator in the third embodiment, FIG. 13C is a diagram showing one example of an output of the drive signal selector to the adder in the third embodiment, FIG. 13D is a diagram showing one example of an output of the drive signal selector to the pull in signal generator in the third embodiment, and FIG. 13E is a diagram showing one example of an output of the pull in signal generator in the third embodiment;

DETAILED DESCRIPTION OF THE PREFERRED EMBODIMENTS

Referring now to the attached drawings, preferred embodiments of an optical disk apparatus according to the present invention will be described as follows.

First Embodiment

Figure 1:
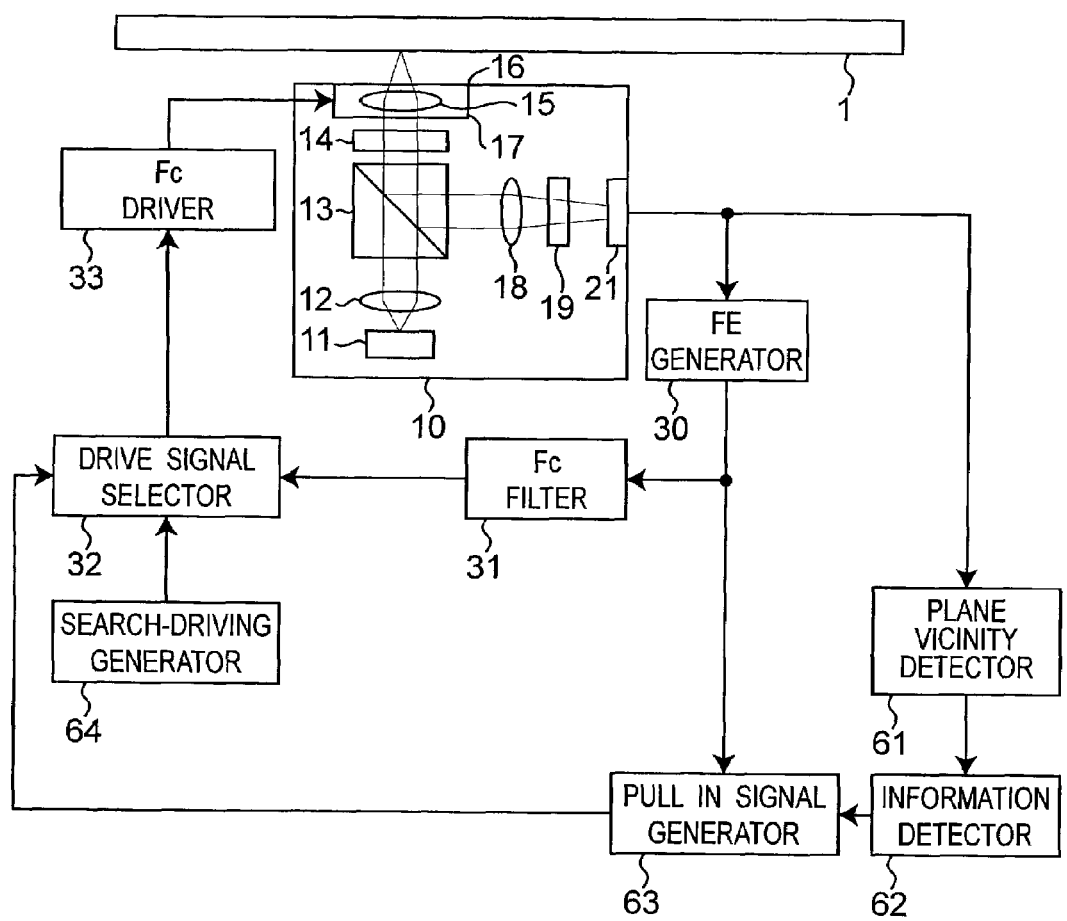
FIG. 1 is a block diagram showing a configuration of an optical disk apparatus of the first embodiment according to the present invention.
Figure 2:
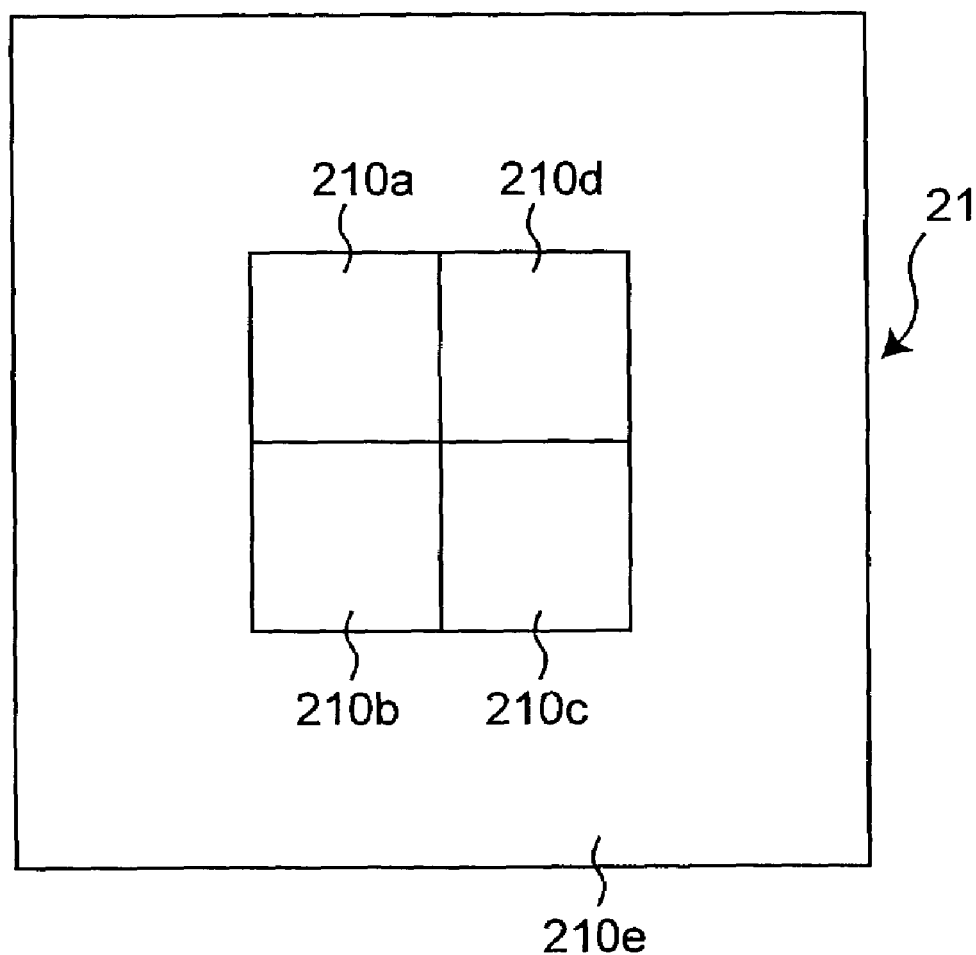
FIG. 2 is a detailed block diagram of a light receiving section of an optical detector of the first embodiment according to the present invention.

FIG. 1 is a block diagram of an optical disk apparatus of the first embodiment according to the present invention. FIG. 2 is a diagram explaining an optical detector 21 which is a means operable to detect the amount of reflected light in the optical disk apparatus of the present embodiment.

Figure 17A:
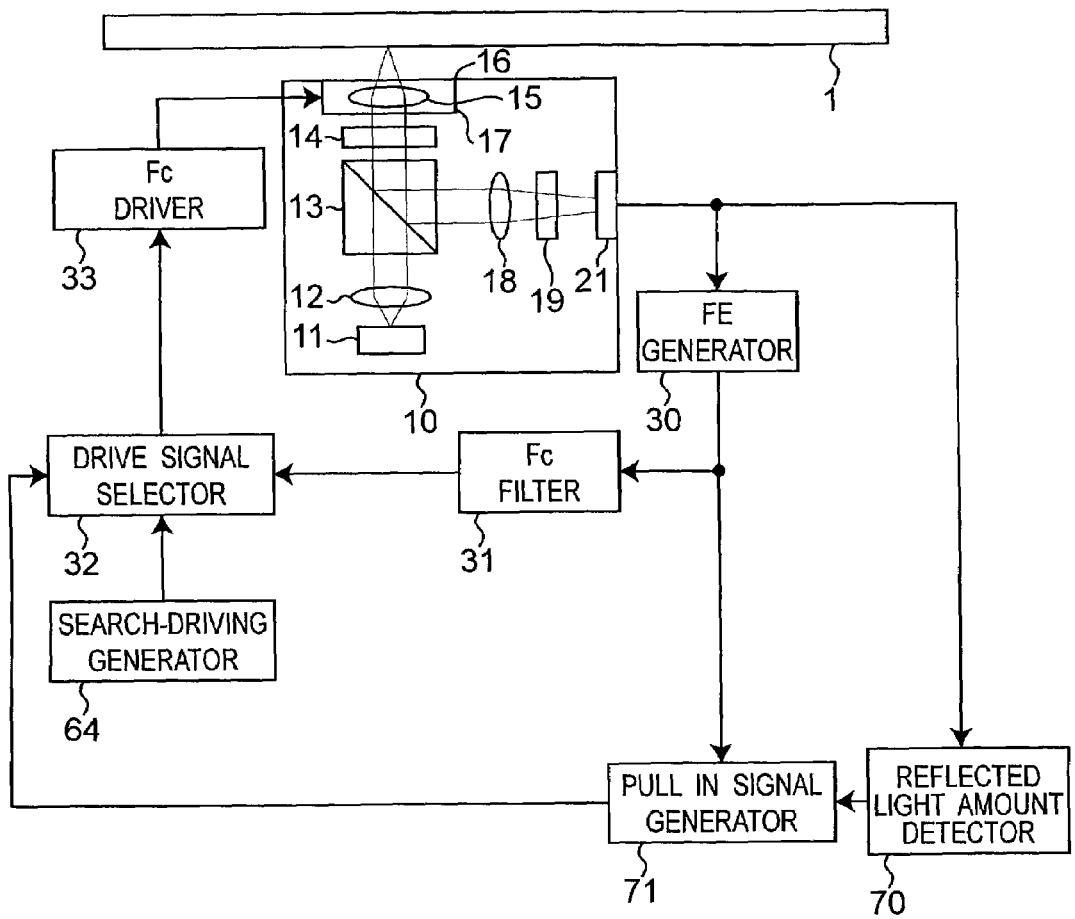
FIG. 17A is a block diagram showing a configuration of a conventional optical disk apparatus.

In FIG. 1, the same reference numerals are used to designate component elements that are similar to those described in FIG. 17A, which illustrates a conventional technique, and thus their explanation will be omitted. An optical disk apparatus according to this embodiment comprises optical head 10, FE generator 30, Fc filter 31, drive signal selector 32, and Fc driver 33. Furthermore, the optical disk apparatus includes plane vicinity detector 61, information plane detector 62, pull in signal generator 63, and search-driving generator 64. The pull in signal generator 63, the drive signal selector 32 and the Fc driver 33 serve as a focus pull in means.

Figure 17B:
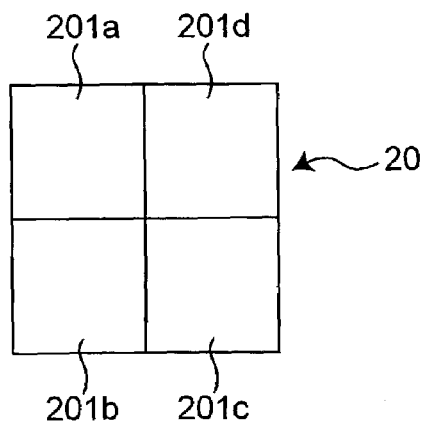
FIG. 17B is a detailed diagram of the light receiving section of the optical detector in the conventional optical disk apparatus.
Figure 18A:
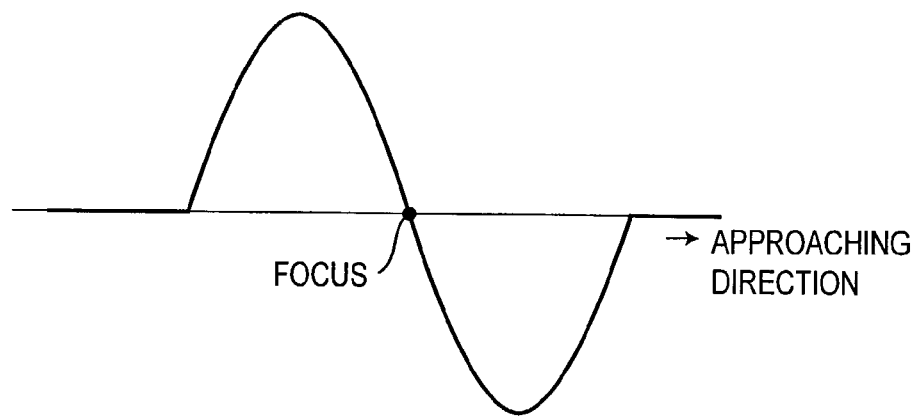
FIG. 18A is a diagram showing one example of an output of an FE generator in the conventional apparatus.
Figure 18B:
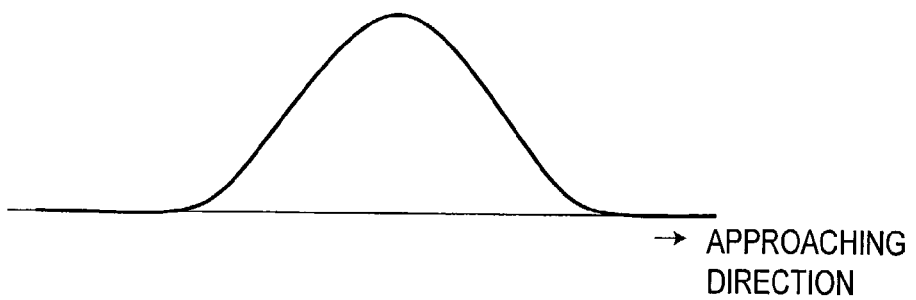
FIG. 18B is a diagram showing one example of an output of the reflected light amount detector in the conventional apparatus.
Figure 19A:
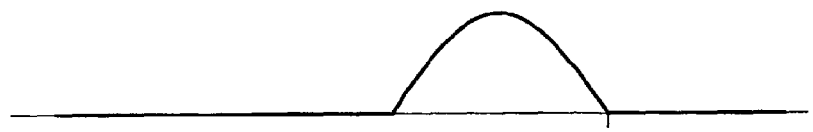
FIG. 19A is a diagram showing one example of an output of an FE generator during the focus pull in operation in the conventional apparatus.
Figure 19B:
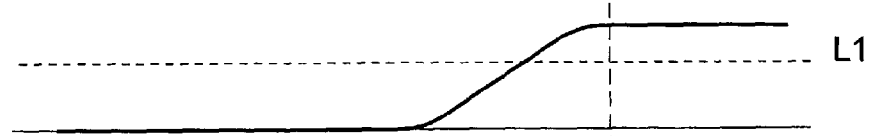
FIG. 19B is a diagram showing one example of an output of the reflected light amount detector in the conventional apparatus.
Figure 19C:
FIG. 19C is a diagram showing one example of an output of the drive signal selector in the conventional apparatus.
Figure 19D:
FIG. 19D is a diagram showing one example of an output of the pull in signal generator in the conventional apparatus.

The optical head 10 according to this embodiment has an optical detector 21 as shown in FIG. 2. The optical detector 20 in the conventional apparatus shown in FIG. 17B is only configured by light receiving sections 210a through 210d, whereas the optical detector 21 according to this embodiment has an O-shaped light receiving section 210e at the center as if it covers the outer periphery of these light receiving sections 210a through 210d in addition to four light receiving sections 210a through 210d. Light receiving sections 210a through 210d receive light from the inner peripheral section of the light beam and the light-receiving section 210e receives the light of the outer peripheral section. Consequently, it becomes possible to divide the optical beam nearly concentrically by light receiving sections 210a through 210d and light receiving section 210e and detect their light amount, and at the same time it is also possible to receive the light which could never have been received in the conventional apparatus when the beam spot of the optical beam is defocused. It should be noted that the optical detector with such a configuration is detailed in application No. 2000-319008 filed in Japan by the same applicant as that of the present application, the contents of which are incorporated herein by reference.

At the time of generating FE signal or of reproducing recorded signals in the FE generator 30, signals based on the light are received at light receiving sections 210a through 210*d* located on the inner side. Signals from the optical detector 21 are sent to the FE generator 30 which is a means to detect out-of-focus and to the plane vicinity detector 61 which is a means to detect plane vicinity.

The surface vicinity detector 61 sends the sum of signals from all the light receiving sections 210*a* through 210*e* of the optical detector 21 to the information plane detector 62 which is a means to identify the information plane. The information plane detector 62, for example, differentiates a signal of the plane vicinity detector 61, judges an increase or decrease of the signal level of the plane vicinity detector 61 in accordance with the polarity of the differentiated signal level, and judges whether or not the beam spot of the optical beam or the focus is located in the vicinity of the information plane. The information surface detector 62 sends a high-level signal to the pull in signal generator 63 in case that the signal level from the plane vicinity detector 61 decreases, or low-level signals in other cases. The pull in signal generator 63 sends a low-level signal to the drive signal selector 32 while a gate signal from the information plane detector 62 is of a high level and until the FE signal from the FE generator 30 crosses the reference level from positive to negative, and thereafter, sends a high-level signal to the drive signal selector 32.

Figure 3A:
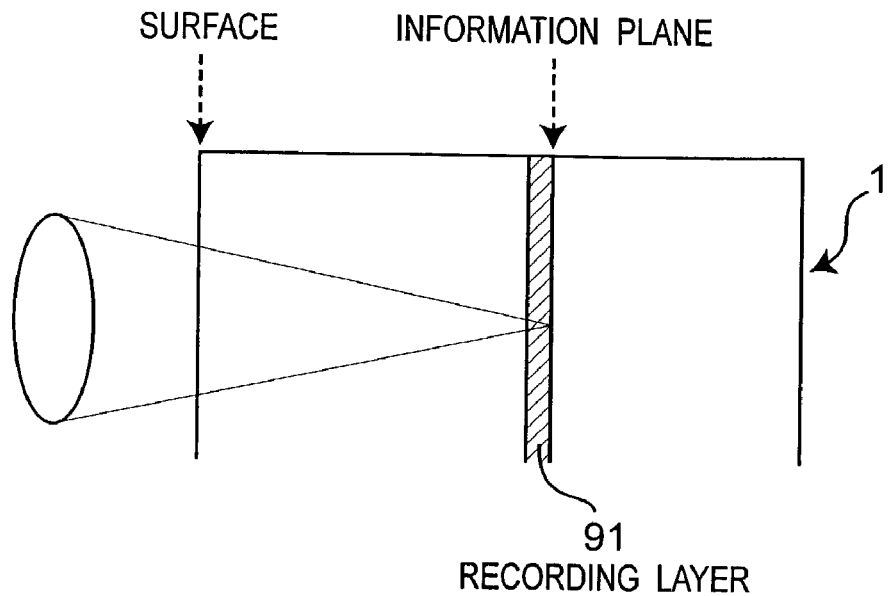
FIG. 3A is a cross-sectional view of an optical disk which has a single information recording layer.
Figure 3B:
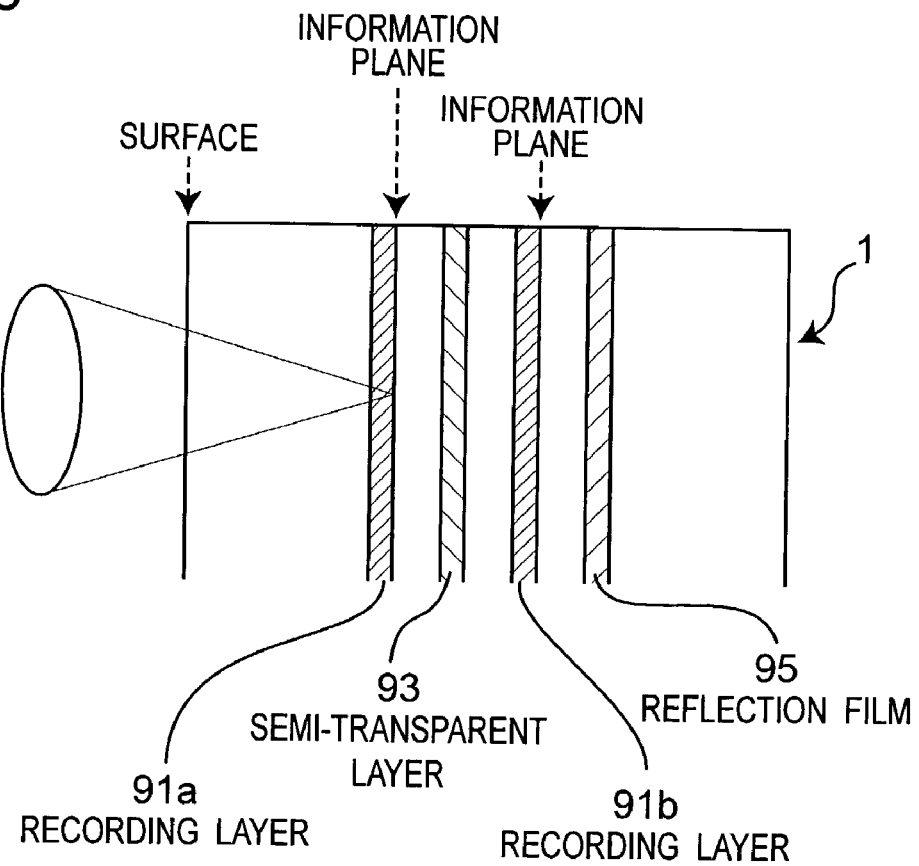
FIG. 3B is a cross-sectional view of an optical disk which has dual information recording layers.

FIGS. 3A and 3B show a configuration of the optical disk 1 which the optical disk apparatus of the present embodiment accesses. FIG. 3A shows a configuration of the optical disk with one recording layer 91 (hereinafter called the "single-layer optical disk"), while FIG. 3B shows a configuration of the optical disk with two recording layers 91*a*, 91*b* (hereinafter called the "dual layer optical disk"). Reflectivity of the optical disk is 12% to 24% in the case of single layer and 4% to 8% in the case of dual layers. It is noted that, this is the case when no information is recorded, and in the case optical disks are recorded, the reflectivity lowers by about 70% as compared to at the time of unrecording. In a single-layer optical disk, a distance from the surface to the information plane is 100±5 μm. In a dual layer optical disk, a distance from the surface to the information plane closer to the surface is 75±5 μm, and the distance between information planes is 30±5 μm.

Referring now to FIGS. 4A through 4C and 5A through 5C, signal waveforms from the plane vicinity detector 61 in the present embodiment will be described. FIGS. 4A through 4C show waveforms from the optical disk 1 with a single recording layer, and FIGS. 5A through 5C show waveforms from the optical disk 1 with dual recording layers. To be more specific, FIG. 4A is a diagram showing one example of FE signal output from the FE generator 30 when the optical disk 1 is of a single layer. FIG. 4B is a diagram showing one example of a signal output from the reflected light amount detector 70 when the optical disk 1 is of a single layer. FIG. 4C is a diagram showing one example of a signal output from the plane vicinity detector 61 when the optical disk 1 is of a single layer. Furthermore, FIG. 5A is a diagram showing one example of FE signal output from the FE generator 30 when the optical disk 1 is of dual layers. FIG. 5B is a diagram showing one example of a signal output from the reflected light amount detector 70 when the optical disk 1 is of dual layers. FIG. 5C is a diagram showing one example of a signal output from the plane vicinity detector 61 when the optical disk 1 is of dual layers.

In FIGS. 4A through 4C and 5A through 5C, the abscissa is a relative position of focus direction of the optical disk 1 and the condensing lens 15 which is a converging means, and a direction from left to right shows means a direction in which the condensing lens 15 comes closer to the optical disk 1 in the figure. In addition, the ordinates of 4A through 4C and 5A through 5C show levels of relevant signals. If the reflectivity in the surface and the information plane are equal as shown in FIGS. 4A and 4B and FIGS. 5A and 5B, there is no difference between FE signal from the FE generator 30 and the signal from the reflected light amount detector 70 and it is impossible to distinguish. As against this, the plane vicinity detector 61 has a further wider detection area because signals from the optical detector 21 which has a wider light detecting area than the conventional optical detector 20 are all added, and waveform covering the surface and the information plane is obtained.

As shown in FIG. 4C and FIG. 5C, because the distance from the surface to the information plane is longer than the distance between information planes irrespective of single layer or of dual layers of optical disk 1, the maximum point of the signal from the plane vicinity detector 61 appears between the surface and the information plane. Consequently, as shown in these figures, since this signal has different gradients when the beam spot of the optical beam is located on the surface side and when located on the vicinity of the information plane, detecting the difference of this gradient can determine the state in which the beam spot of the optical beam is located in the vicinity of surface and the state in which the beam spot of optical beam is located in the vicinity of information plane.

Figure 6A:
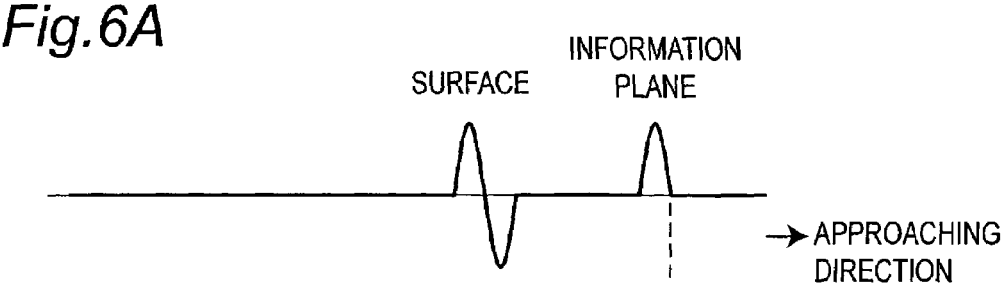
FIG. 6A is a diagram showing one example of an output of FE generator when a focus pull in operation is carried out in the first embodiment.
Figure 6B:
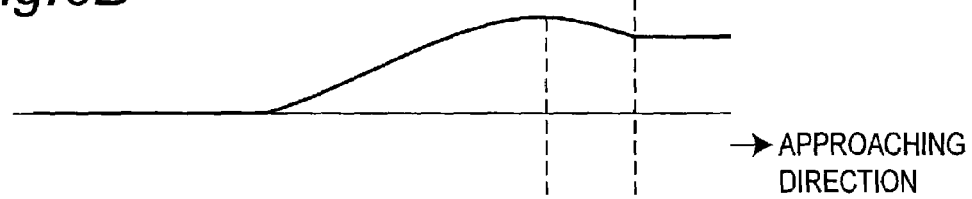
FIG. 6B is a diagram showing one example of an output of a plane vicinity detector in the first embodiment.
Figure 6C:
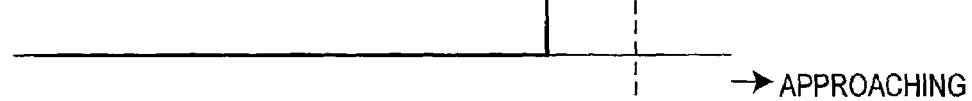
FIG. 6C is a diagram showing one example of an output of an information plane detector in the first embodiment.
Figure 6D:
FIG. 6D is a diagram showing one example of an output of a drive signal selector in the first embodiment.
Figure 6E:
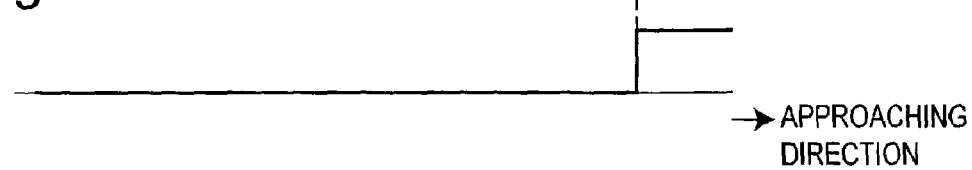
FIG. 6E is a diagram showing one example of an output of a pull in signal generator in the first embodiment.
Figure 7:
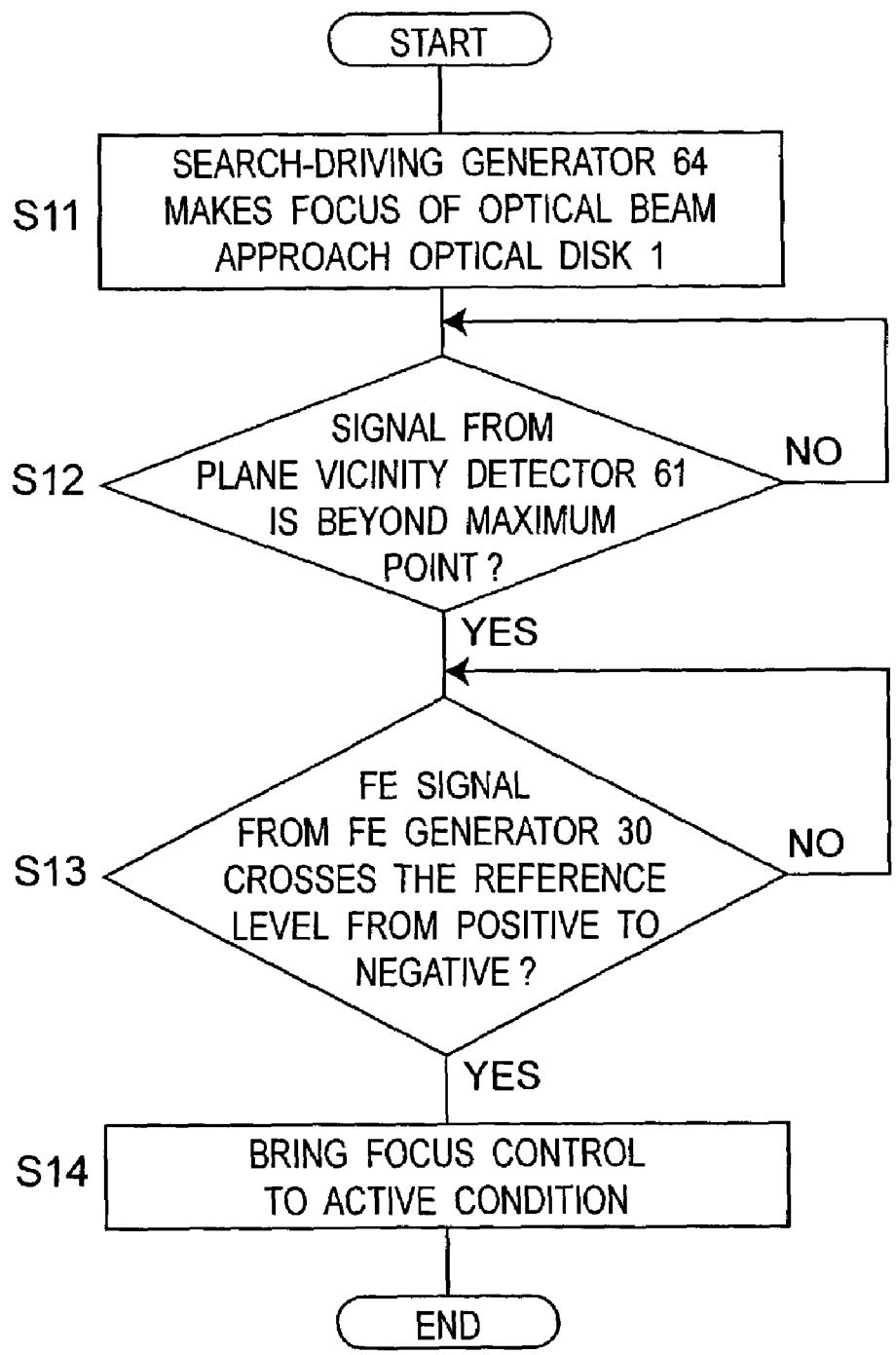
FIG. 7 is a flow chart of the operation of the optical disk apparatus of the first embodiment.

Referring now to FIGS. 6A through 6E and FIG. 7, a focus pull in operation in the optical disk apparatus according to the present embodiment will be described. FIG. 6A is a diagram showing one example of FE output signal from the FE generator 30. FIG. 6B is a diagram showing one example of a signal output from the plane vicinity detector 61. FIG. 6C is a diagram showing one example of a signal output from the information plane detector 62. FIG. 6D is a diagram showing one example of a signal output from the drive signal selector 32. FIG. 6E is a diagram showing one example of a signal output from the pull in signal generator 63. In FIGS. 6A through 6E, each abscissa shows a time, and each ordinate shows a level of the relevant signal. FIG. 7 is a flow chart that indicates this sequence.

The polarity of the signal from the drive signal selector 32 which is necessary for condensing lens 15 to move in the direction for approaching to the optical disk 1 is positive in FIG. 6D. As shown in FIG. 6E, since the signal from the pull in signal generator 63 is of a low level at the start of focus pull in operation, the drive signal selector 32 sends the signal from the search-driving generator 64 to the Fc driver 33. From the condition in which the optical disk 1 and the condensing lens 15 are sufficiently separated, as shown in FIG. 6D, the search-driving generator 64 generates a drive operation in the direction in which the condensing lens 15 approaches the optical disk 1 (Step S11). As shown in FIG. 6B, as the beam spot of the optical beam comes closer to the surface of the optical disk 1, the positive signal from the plane vicinity detector 61 is generated. With the signal level from the plane vicinity detector 61 monitored, the condensing lens 15 is brought closer to the optical disk 1 until the signal level from the plane vicinity detector 61 exceeds the maximum point (Step S12). By this, the beam spot of the optical beam continues to approach the optical disk 1.

Thereafter, the beam spot of the optical beam passes the surface of the optical disk 1 and the signal level from the plane vicinity detector 61 exceeds the maximum point, the signal from the information plane detector 62 changes from a low level to a high level as shown in FIG. 6C. And it is waited that the FE signal from the FE generator 30 crosses the reference level set to 0 from positive to negative (Step S13). Thus, the beam spot of the optical beam continues to further approach the optical disk 1. As shown in FIG. 6A, when the FE signal from the FE generator 30 changes from positive to negative at the information plane, the signal to the drive signal selector 32 is changed from a low level to a high level as shown in FIG. 6E, and thus, the focus control is brought to be active (or an operating condition) (Step S14).

Subsequently, as shown in FIG. 6D, drive signal selector 32 uses not the signal from the search-driving generator 64, but the signal from the Fc filter 31, for a signal to be sent to the Fc driver 33.

In this way, since according to the present embodiment, it is possible to detect that the beam spot position is located between the disk surface and the information plane using the sum signal of output signals from the optical detector 21 shown in FIG. 2, which has waveforms shown in FIG. 4C or FIG. 5C, the focus pull in operation can be more definitely carried out on the information plane of the optical disk 1.

In the present embodiment, the plane vicinity detector 61 sends total addition signals of optical detector 21. However only a signal from the light receiving section 210e shown in FIG. 2 may be used.

Furthermore, although in the above embodiment, the information plane detector 62 detects the information plane from the gradient of the signal from the plane vicinity detector 61, the following method also may be available. When the FE signal from the FE generator 30 is maximum, a signal level from the plane vicinity detector 61 is stored in a memory, and a signal level from the plane vicinity detector 61 is compared with the stored signal level when the FE signal from the FE generator 30 crosses the reference level. If the stored signal level is smaller, information plane detector 62 may judge that the beam spot of the optical beam is located in the vicinity of the information plane.

In the present embodiment, a light receiving section specialized for detecting the light applied to the outer periphery of the optical detector 21 is provided. Instead of that, a light receiving section for sub-beams which is used when positional error between a track and the beam spot of the optical beam is generated by DPP method or 3-beam method may be provided.

Furthermore, the plane vicinity detector 61 and the information plane detector 62 may be provided in the optical head 10.

Second Embodiment

As described in Prior Art, the condensing lens is supported by an elastic material such as a spring in the optical disk apparatus. Consequently, if the condensing lens vibrates up and down due to influence of face-runout or vibrations from outside, etc. when no control such as a focus control is implemented to the condensing lens, the condensing lens and the optical disk may collide against each other. Therefore, in the present embodiment, an optical disk apparatus that prevents such a collision with the condensing lens under non-control condition will be described.

Figure 8:
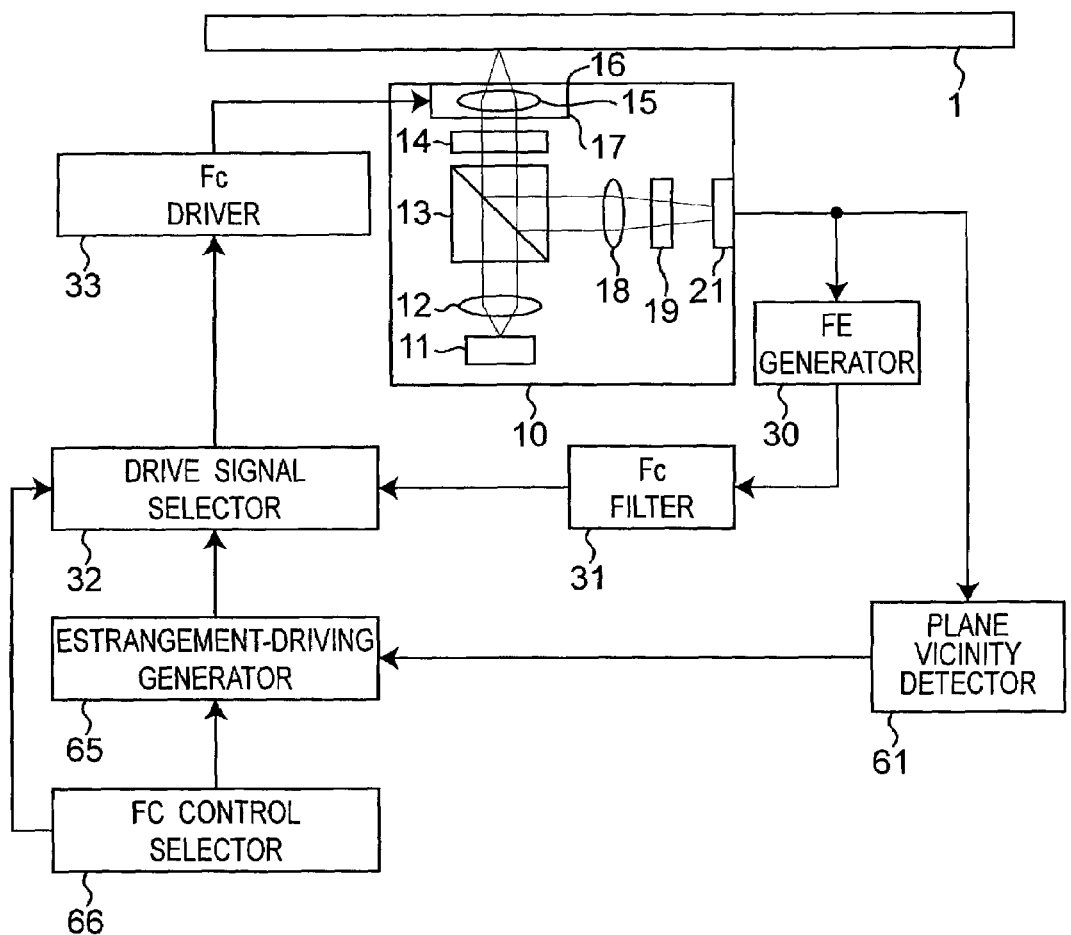
FIG. 8 is a block diagram showing the configuration of the optical disk apparatus of a second embodiment according to the present invention.

FIG. 8 shows a block diagram of an optical disk apparatus in the second embodiment. In FIG. 8, the same reference numerals are assigned to component elements which are same or corresponding to component elements in FIG. 16 which is a conventional art, and description will be omitted.

The optical disk apparatus of the present embodiment includes optical head 10, FE generator 30, Fc filter 31, drive signal selector 32, and Fc driver 33. Furthermore, the optical disk apparatus includes plane vicinity detector 61, estrangement-driving generator 65 and Focus control selector (hereinafter called the "Fc control selector") 66. The estrangement drive generator 65 and the Fc driver 33 serve as a means for generating avoidance driving. The configuration of the optical detector 21 is as described in FIG. 2.

At the time of FE signal generation and recorded signal reproduction in the FE generator 30, signals based on light received by light receiving sections 210a through 210d located on the inner side are used. Signals from the optical detector 21 are sent to the FE generator 30 and the plane vicinity detector 61. The plane vicinity detector 61 sends sum signal of all the light receiving sections of the optical detector 21 to the estrangement-driving generator 65. The estrangement-driving generator 65 generates a fixed value driving signal for the Fc actuator 16 for separating the condensing lens 15 from the optical disk 1 when the signal level from the plane vicinity detector 61 is greater than a specified level L2, and then sends the driving signal to the drive signal selector 32. The estrangement-driving generator 65 sends "0" to the drive signal selector 32 when the signal level from the plane vicinity detector 61 is smaller than the specified level L2. The Fc control selector 66 sends a low-level signal to the drive signal selector 32, for example, when the focus control is brought to be inactive, or a high-level signal to the drive signal selector 32 when the focus control is brought to be active.

Figure 10:
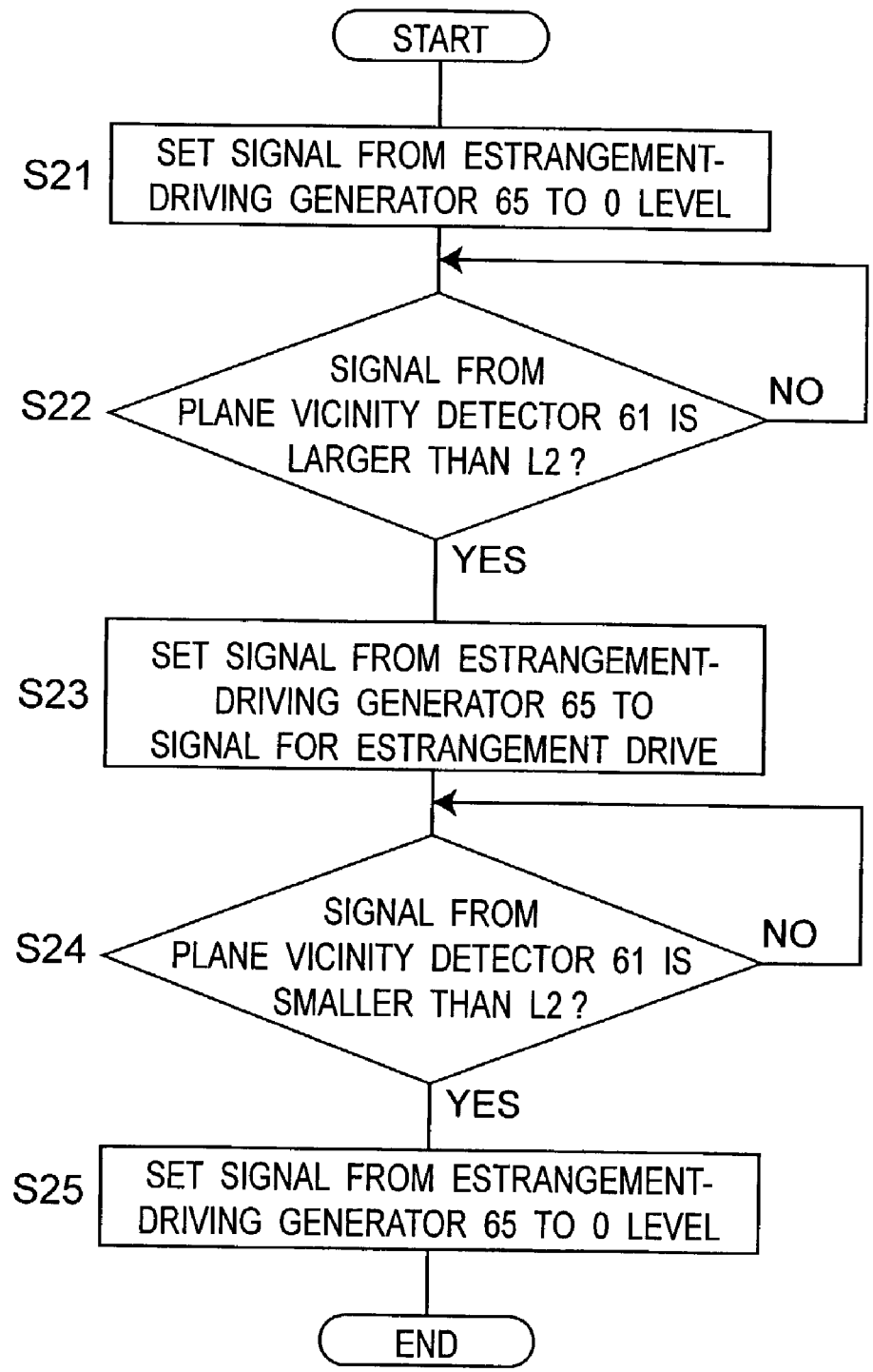
FIG. 10 is a flow chart of the operation of the optical disk apparatus according to the second embodiment.

Referring now to FIGS. 9A through 9C and FIG. 10, description will be made on a collision avoiding operation in the optical disk apparatus according to the present embodiment. FIG. 9A is a diagram showing one example of FE signal output from the FE generator 30. FIG. 9B is a diagram showing one example of a signal output from the plane vicinity detector 61. FIG. 9C is a diagram showing one example of a output signal from the estrangement-driving generator 65. In FIGS. 9A through 9C, each abscissa is a relative position in the focus direction between the optical disk 1 and the condensing lens 15, and in the diagram, it is the approaching direction from left to right. In addition, ordinates of FIGS. 9A through 9C show levels of relevant signals. FIG. 10 is a flow chart showing this sequence.

Referring now to FIG. 10, 0-level signals are sent from the estrangement-driving generator 65 to the Fc actuator 16 via the drive signal selector 32 and the Fc driver 33 (Step S21). Thus, the condensing lens 15 stays at the natural position which is defined by supporting members such as a spring.

And it is detected whether or not the signal from the plane vicinity detector 61 is greater than the specified level L2 (Step S22). In the event that the condensing lens is vibrated up and down due to face-runout by rotation of the optical disk 1 or vibrations from outside, etc., the condensing lens 15 and the optical disk abnormally come close to each other. In this time, the signal from the plane vicinity detector 61 becomes greater than the level L2.

When the signal from the plane vicinity detector 61 becomes greater than the level L2, as shown in FIG. 9C, the estrangement-driving generator 65 sends to the drive signal selector 32 a signal (negative-level signal) for moving the condensing lens 15 in the direction separating from the optical disk 1 (Step S23). In such an event, since the focus control is inactive, a low-level signal is sent from the Fc control selector 66 to the drive signal selector 32, and the drive signal selector 32 chooses the signal from the estrangement-driving generator 65 and sends it to the Fc driver 33. Thus, the condensing lens 15 moves away from the optical disk 1.

When the condensing lens 15 approaches further the optical disk 1 from the position where the beam spot of the optical beam converges on the information plane, the condensing lens 15 collides with the optical disk 1 at the collision position shown in FIG. 9. Because a signal from the plane vicinity detector 61 can be detected in a wide area, and the position where the condensing lens 15 collides with the optical disk 1 is close to the position of the condensing lens 15 at the focalized point, even if the beam spot of the optical beam moves to the approaching direction and reaches the collision position as shown in FIG. 9B, the signal level from the plane vicinity detector 61 is not attenuated to the zero level. Consequently, it is possible to detect that the distance between the optical disk 1 and the condensing lens 15 is within a specified value by comparing the signal level from the plane vicinity detector 61 with the specified level L2, and it is possible to carry out the collision avoiding operation in accordance with the detection results.

After estrangement driving, it is waited until the signal from the plane vicinity detector 61 become smaller than the level L2 (Step S24). Thus, a signal for estrangement driving continues to come on from the estrangement-driving generator 65, and the condensing lens 15 stays at the position distant from the optical disk 1.

By and by, when the signal from the plane vicinity detector 61 becomes smaller than the level L2, it means that the distance between the condensing lens 15 and the optical disk 1 is sufficiently separated, and therefore, the signal from the estrangement-driving generator 65 is brought to the 0 level (Step S25). Thus, the condensing lens stays in the natural position again.

It is noted that, a high-level signal is sent from the Fc control selector 66 to the drive signal selector 32, and when the focus control is in operation, the drive signal selector 32 chooses the signal from the Fc filter 31, and therefore, the signal from the estrangement-driving generator 65 does not affect the focus control.

According to the present embodiment, since each time the condensing lens 15 comes close to the optical disk 1 with the condensing lens under a no-control condition, it is possible to avoid collision between the optical disk 1 and condensing lens 15.

It is noted that, in the present embodiment, the plane vicinity detector 61 sends all added signals of the optical detector, but only the signal from the light receiving section 210e shown in FIG. 2 may be used.

In the present embodiment, based on the results of comparing a distance between the optical disk 1 and the condensing lens 15 with the specified distance, the estrangement-driving generator 65 changes over two kinds of driving operations and sends a signal to the Fc actuator 16 via the drive signal selector 32 and the Fc driver 33 to separate the condensing lens 15 from the optical disk 1. Instead of that, a signal which is obtained by inverting the polarity of the signal from the plane vicinity detector 61 multiplied by a specified gain may be sent to the Fc actuator 16.

Although in the present embodiment, dedicated light-receiving sections are provided for detecting light irradiated to the peripheral portion of the optical detector 21, light-receiving sections provided for a sub-beam which is used when a positional error between the track and the beam spot of the optical beam may be generated by DPP method or 3 beam method.

Third Embodiment

Figure 11:
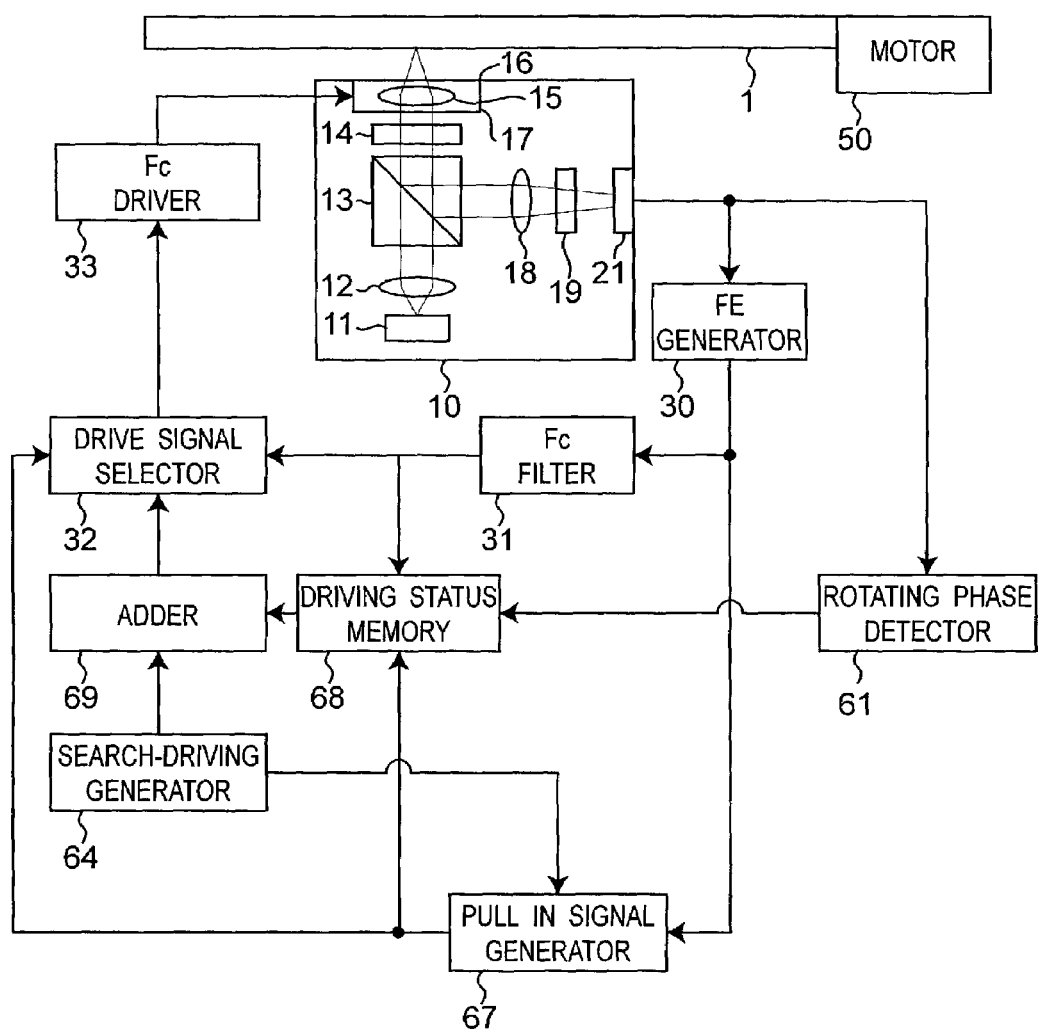
FIG. 11 is a block diagram showing a configuration of the optical disk apparatus of a third embodiment according to the present invention.

FIG. 11 shows a block diagram of an optical disk apparatus in the third embodiment. In FIG. 11, same reference numerals are assigned to same or corresponding component elements to those in FIG. 16 which is a conventional art and their description will be omitted. The optical disk apparatus according to this embodiment includes optical head 10, FE generator 30, Fc filter 31, drive signal selector 32, and Fc driver 33, and further has rotating phase detector 51, driving status memory 68, adder 69, pull in signal generator 67, and search-driving generator 64.

The pull in signal generator 67, the drive signal selector 32 and the Fc driver 33 serve as a focus pull in means.

The search drive generator 64 sends, to the pull in signal generator 67, a high-level signal to the pull in signal generator 67 when the drive signal to be generated is directed to the separating operation, or a low-level signal pull in when the drive signal to be generated is directed to the approaching operation.

The pull in signal generator 67 sends a low-level signal to the drive signal selector 32 when the signal from the search-driving generator 64 is of a high level and until the FE signal from the FE generator 30 crosses the reference level from negative to positive, and thereafter sends a high-level signal to the drive signal selector 32.

The motor 50 rotates the optical disk 1 and sends 1000 encoder pulses per one rotation to the rotating phase detector 51. The rotating phase detector 51 counts rising edges of encoder pulses from the motor 50. When counting 1000 pulses which corresponds to one rotation, the rotating phase detector 51 clears the count value to zero. The rotating phase detector 51 sends the count value to the driving status memory 68 which is a means operable to store face-runout information.

The driving status memory 68 stores a driving signal from the Fc filter 31 to an address corresponding to the count value from the rotating phase detector 51 when the signal from the pull in signal generator 67 is of a high level, and sends zero-level to the adder 69 which is a means operable to apply face-runout signal. Furthermore, the driving status memory 68 does not update the stored data while the signal from the pull in signal generator 67 is of a low level, and sends to the adder 69 data stored on the address based on the count value from the rotating phase detector 51. The adder 69 adds the signal from the search-driving generator 64 to the signal from the driving status memory 68 to send the added signal to the drive signal selector 32.

Figure 12A:
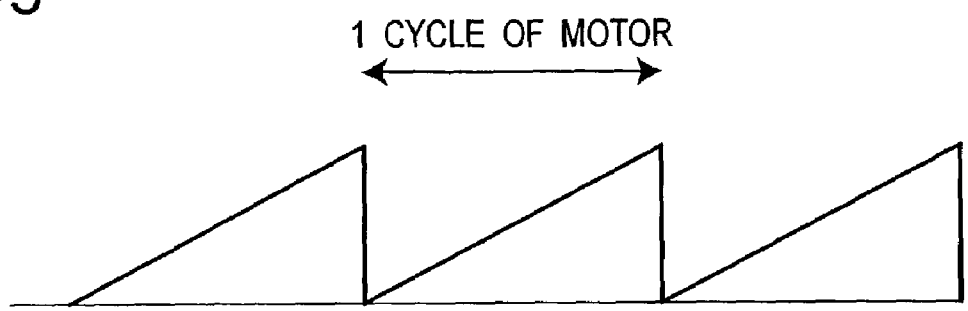
FIG. 12A is a diagram showing one example of an output of the rotating phase detector in the third embodiment.
Figure 12B:
FIG. 12B is a diagram showing one example of an output of the Fc filter in the third embodiment.

Referring now to FIGS. 12A and 12B, operation of the driving status memory 68 will be explained. FIG. 12A shows a diagram showing one example of the signal output from the rotating phase detector 51. FIG. 12B is a diagram showing one example of the signal output from the Fc filter 31. In FIGS. 12A and 12B, each abscissa shows a time, while each ordinate shows a level of the relevant signal. FIGS. 12A and 12B shows waveforms while the focus control is active. Consequently, the pull in signal generator 57 sends a high-level signal to the driving status memory 68 and the drive signal selector 32. Because the signal from the pull in signal generator 67 is of a high level, the drive signal selector 32 sends a signal from the Fc filter 31 to the Fc driver 33.

As shown in FIG. 12A, the signal from the rotating phase detector 51 becomes a saw-tooth wave with the same cycle as the rotating cycle of the motor 50, and the level of the signal indicates the rotating phase information of the motor 50. If the optical disk 1 has any face-runout associated with rotation, the condensing lens 15 follows the face-runout by the focus control, and the Fc filter 31 sends a signal synchronized with the rotation cycle of the motor 50 as shown in FIG. 12C. Using this periodicity, the driving status memory 68 stores the signal level from the Fc filter 31 while varying storage addresses in accordance with the rotating phase information from the rotating phase detector 51. It is enough to store the information during a period of one round of the motor 50, because the information stored can be repeatedly used thereafter. That is, the information on one cycle is the sufficient information.

When the focus control is not active, the driving status memory 68 does not carry out the storage operation because the signal from the pull in signal generator 67 is of a low level, obtains a stored value from the stored address based on the rotating phase information from the rotating phase detector 51, and sends it to the adder 69.

It is noted that the drive signal from the Fc filter 31 when the focus control is active corresponds to face-runout of the optical disk 1. The driving status memory 68 stores this drive signal which is associated with the rotating phase information of the optical disk from the rotating phase detector 51. Consequently, even when the focus control is not active, the signal from the driving status memory 68 can be used, and thus the operation to reduce the face-runout of the optical disk 1 can be achieved.

Figure 14:
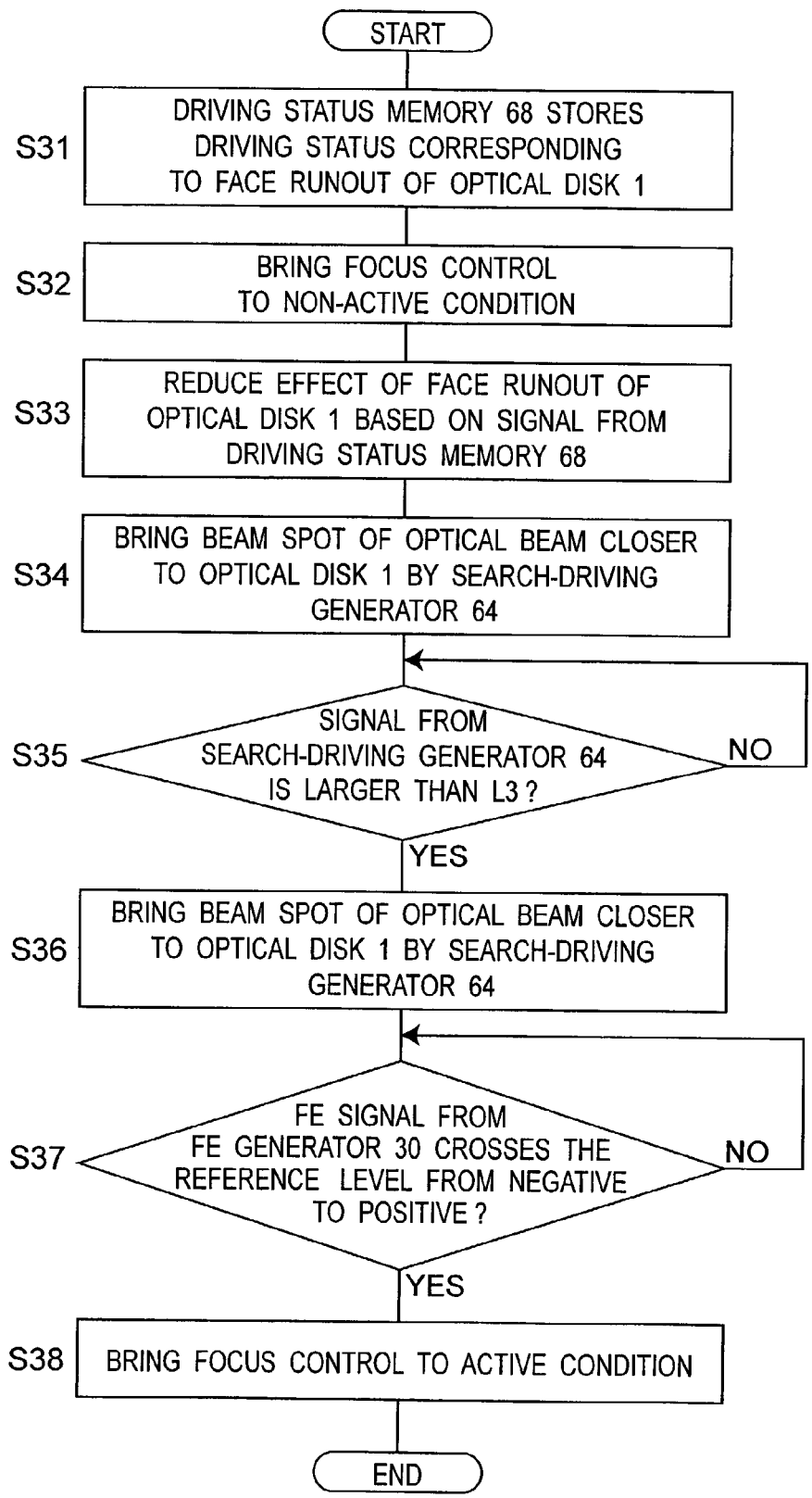
FIG. 14 is a flow chart showing the operation of the optical disk apparatus of the third embodiment.

Referring now to FIGS. 13A through 13E and FIG. 14, focus pull in operation in the present embodiment will be described. FIG. 13A is a diagram showing one example of FE signal output from the FE generator 30. FIG. 13B is a diagram showing one example of a signal output from the search-driving generator 64 to the adder 69. FIG. 13C is a diagram showing one example of a signal output from the drive signal selector 32. FIG. 13D is a diagram showing one example of a signal output from the search-driving generator 64 to the pull in signal generator 67. FIG. 13E is a diagram showing one example of a signal output from the pull in signal generator 67. In FIGS. 13A through 13E, each abscissa shows a time and each ordinate shows a level of the relevant signal. The polarity of signals from the drive signal selector 32 which are required for the condensing lens 15 to travel in the direction for approaching the optical disk 1 is positive in FIG. 13B and FIG. 13C. FIG. 14 is a flow chart showing this sequence.

To operate this sequence, it is a prerequisite that the focus control is active (or in operation). As described before, the driving status memory 68 stores the drive signal that corresponds to face-runout of the optical disk 1 (Step S31). The focus control is brought to inactive (or non-operating condition) (Step S32). The drive driving status memory 68 sends to the Fc actuator 16 a signal for suppressing influence of the face-runout based on the rotating phase information from the rotating phase detector 51 via the adder 69, the drive signal selector 32, and the Fc driver 33 (Step S33). Thus, the position of the condensing lens, that is, the position of the beam spot of the optical beam varies nearly following the face-runout of the optical disk 1.

The search-driving generator 64 outputs a signal for enabling the drive to bring the beam spot of the optical beams as shown in FIG. 13B closer to the optical disk 1 to the adder 69 (Step S34). Thus, the waveform as shown in FIG. 13C is obtained from the drive signal selector 32. This waveform indicates that seemingly difficult operation is being carried out., but this waveform results from the signal from the search-driving generator 64 added with the signal from the driving status memory 68 and follows the face-runout of the optical disk 1 Thus the relative distance between the optical disk 1 and the condensing lens 15 decreases nearly at a constant velocity.

When the signal from the search-driving generator 64 to the adder 69 are for a drive to bring the condensing lens 15 and the optical disk 1 closer to each other, as shown in FIG. 13D, a signal from the search-driving generator 64 to the pull in signal generator 67 becomes a low level. The bing-in signal generator 67 sends constantly a low-level signal to the drive signal selector 32 as shown in FIG. 13E because the signal from the search-driving generator 64 is of a low level. The drive signal selector 32 makes the focus control constantly brought to be inactive because the signal of the pull in signal generator 67 is constantly of a low level, and the signal from the adder 69 is continuously sent to the Fc actuator via the Fc driver 33.

The search-driving generator 64 waits until a level of the signal to the adder 69 reaches a specific level L3 (Step S35). Consequently, the beam spot of the optical beam continues to come closer to the optical disk 1. As shown in FIG. 13B, the search-driving generator 64 changes the drive from approaching to separating direction when the level of the signal to the adder 69 reaches the level L3 (Step S36). The value of level L3 should be set to a value which indicates the condition in which the beam spot of the optical beam is definitely located deeply from the information plane. Consequently, the information plane to which the focus control is applied is searched by driving from the level L3 in the separating direction. In addition, since the driving signal corresponding to the face-runout of the optical disk 1 is outputted from the driving status memory 68, the condensing lens 15 and optical disk 1 will not collide against each other by the influence of face-runout of the optical disk 1. In addition, as shown in FIG. 13D, the signal from the search-driving generator 64 to the pull in signal generator 67 achieves a high level.

Since the signal from the search-driving generator 64 is of a high level, as shown in FIG. 13A, the pull in signal generator 67 waits until the FE signal from the FE generator 30 crosses the reference level from negative to positive (Step S37). Consequently, the beam spot of the optical beam continues to be separated from the optical disk 1. When the FE signal from the FE generator 30 crosses the reference level from negative to positive, as shown in FIG. 13E, a high-level signal is sent to the drive signal selector 32 (Step S38). The drive signal selector 32 begins to send a signal from the Fc filter 31 to the Fc driver 33 when the signal from the pull in signal generator 67 achieves a high level. In this way, the focus control can be brought into active condition.

Once the focalized point is passed, the focus pull in operation is carried out from above the focalized point position. This causes the FE signal to first appear definitely on the information plane. Therefore, even if reflectivity of the surface and reflectivity of information plane are equivalent, erroneous focus pull in to the surface of the optical disk 1 will never occur. In addition, even in the case that the distance from the focalized point to the colliding position is short, since influence of face-runout of the optical disk 1 can be reduced by the function of the driving status memory 68, the beam spot of the optical beam can pass the focalized point with the optical disk 1 not collided with the condensing lens 15 by the boundary value L3 of the search-driving generator 64, and focus pull in operation can be carried out from the position still closer to the disk surface.

Fourth Embodiment

Figure 15:
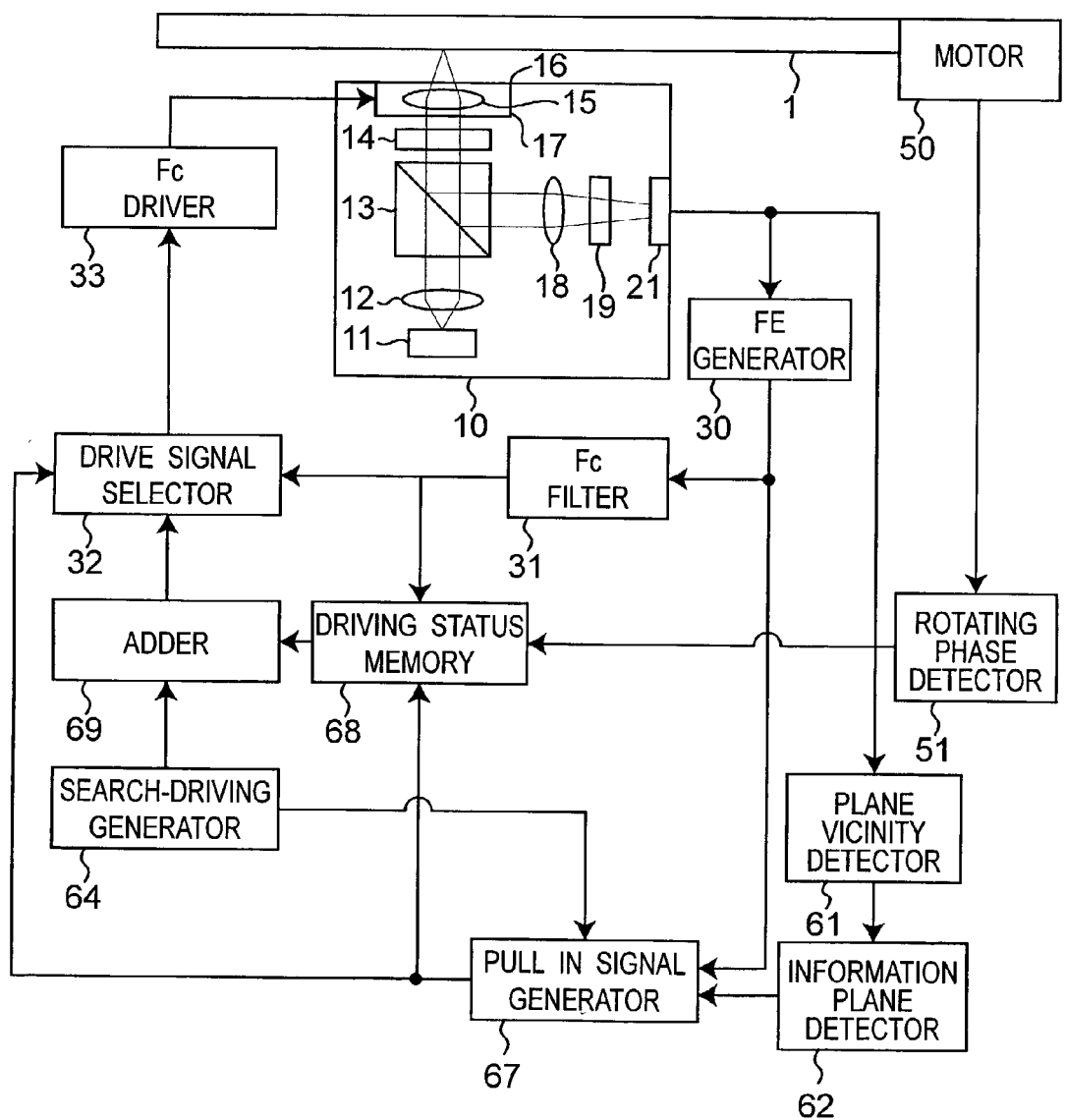
FIG. 15 is a block diagram showing the configuration of the optical disk apparatus of the third embodiment according to the present invention.

FIG. 15 is a block diagram of an optical disk apparatus according to the fourth embodiment. The optical disk apparatus according to this embodiment includes plane vicinity detector 61 and information plane detector 62 in addition to the configuration of the optical disk apparatus according to the third embodiment shown in FIG. 15. It is noted that the optical disk apparatus is equipped with optical the detector 21 with a wide optical detection range shown in FIG. 2 in place of the optical detector shown in FIG. 15.

FIGS. 16A through 16E show output signal waveforms of main blocks of the optical disk apparatus according to the present embodiment.

Figure 16A:
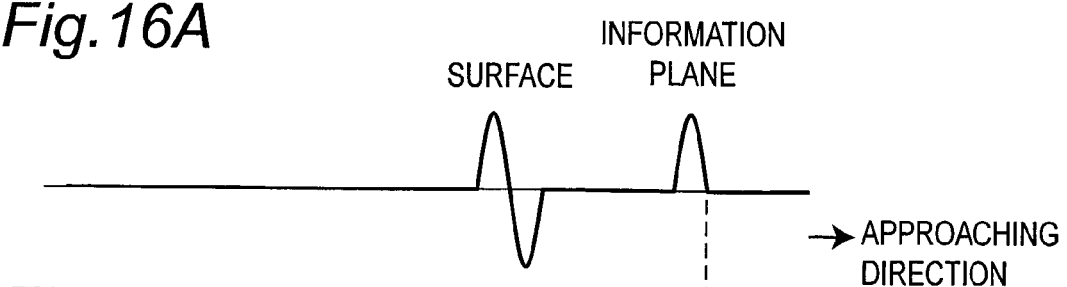
FIG. 16A is a diagram showing one example of an output of an FE generator during the focus pull in operation in a fourth embodiment.
Figure 16B:
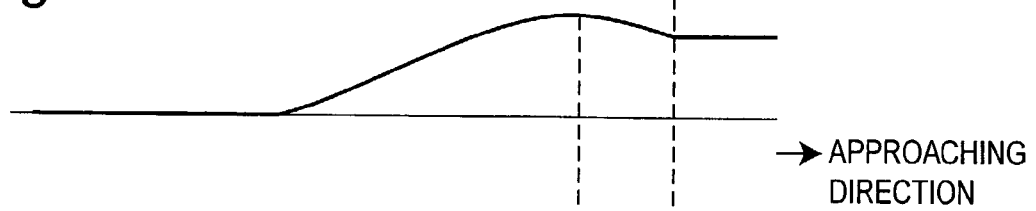
FIG. 16B is a diagram showing one example of an output of the plane vicinity detector in the fourth embodiment.
Figure 16C:
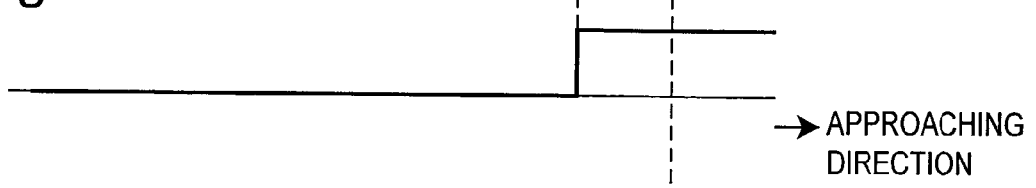
FIG. 16C is a diagram showing one example of an output of the information plane detector in the fourth embodiment.
Figure 16D:
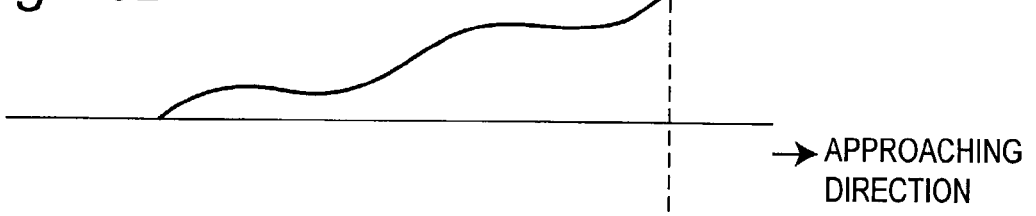
FIG. 16D is a diagram showing one example of an output of the drive signal selector in the fourth embodiment.
Figure 16E:
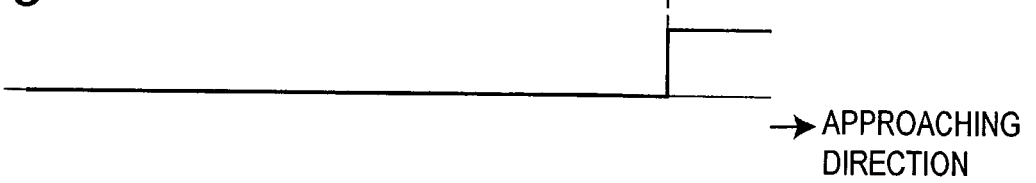
FIG. 16E is a diagram showing one example of an output of the pull in signal generator in the fourth embodiment.

FIG. 16A is a diagram showing one example of FE signal output from the FE generator 30. FIG. 16B is a diagram showing one example of a signal output from the plane vicinity detector 61. FIG. 16C is a diagram showing one example of a signal output from the information plane detector 62. FIG. 16D is a diagram showing one example of a signal output from the drive signal selector 32. FIG. 16E is a diagram showing one example of a signal output from the pull in signal generator 63.

The optical disk apparatus according to the present embodiment changes the signal from the information plane detector 62 from a low level to a high level when the maximum point of the output signal from the plane vicinity detector 61 is detected (see FIG. 16C). Thereafter, when the FE signal changes from positive to negative, the signal from the search-driving generator 64 to the drive signal selector 32 are changed from a low level to a high level and thus the focus control is brought into the active condition (see FIG. 16E). The operation described above is the same as that of the optical disk apparatus of the first embodiment.

The optical disk apparatus according to the present embodiment further carries out a drive to bring the condensing lens 15 closer to the optical disk 1 with the condensing lens 15 following the face-runout as shown in the third embodiment. Consequently, the drive signal selector 32 outputs the signal as shown in FIG. 16D. This control is detailed as described in the third embodiment.

According to the optical disk of the present embodiment, it becomes possible to carry out focus pull in operation to the information plane of the optical disk 1 more definitely while avoiding collision more surely.

According to the present invention, in the case that the beam spot of the optical beam and the surface of optical disk come extremely closer during data recording or data reproducing as a recording density of the optical disk increases, or even when the reflectivity of information plane lowers to become equivalent to the reflectivity of the disk surface, an optical disk apparatus operable to perform highly reliable focus pull in operation can be provided, while avoiding collisions between the condensing lens and the optical disk and preventing damages to the condensing lens or the optical disk.

Although the present invention has been described in connection with specified embodiments thereof, many other modifications, corrections and applications will be apparent to those skilled in the art. Therefore, the present invention is not limited by the disclosure provided herein but limited only to the scope of the appended claims.

The present disclosure relates to subject matter contained in Japanese Patent Application No. 2001-381332, filed on Dec. 14, 2001, which is expressly incorporated herein by reference in its entirety.

What is claimed is:

1. An optical disk apparatus for recording or reproducing data to or from a rotating information medium which has at least one information plane, the apparatus comprising:

a converging section operable to converge an optical beam to irradiate the converged beam onto the rotating information medium;

a focus moving section operable to move the converging section in a direction normal to the information plane of the information medium;

an optical detection section having a light receiving area divided substantially concentrically into plural areas, and being operable to receive reflected light from the information medium and output a signal corresponding to the amount of the reflected light;

a plane vicinity detecting section operable to generate a vicinity detection signal based on a signal from the optical detection section, the vicinity detection signal continuously varying so as to have one maximum point while a beam spot of the optical beam moves from the surface to the information plane of the information medium;

a search driving section operable to generate a driving signal for approaching or separating the beam spot of the optical beam with respect to the information medium;

a focus error detecting section operable to generate a signal corresponding to an error of a focus position of the optical beam with respect to the information plane or the surface of the information medium;

a focus control driving section operable to generate a signal for driving the focus moving section so that the beam spot of the optical beam follows the information plane of the information medium in accordance with the signal from the focus error detecting section;

an information plane determining section operable to determine whether or not the beam spot of the optical beam is located in the vicinity of the information plane of the information medium based on signals from the plane vicinity detecting section and the focus error detecting section; and a focus pull in section operable to select and supply either of the signal from the focus control driving section or the signal from the search driving section to the focus moving section in accordance with a signal from the information plane determining section.

2. The optical disk apparatus according to claim 1, wherein the information plane determining section is operable to judge that the beam spot of the optical beam is located in the vicinity of the information plane when a signal level from the plane vicinity detecting section is decreasing.

3. The optical disk apparatus according to claim 2, wherein the information plane determining section is operable to differentiate the signal from the plane vicinity detecting section, and judge that the beam spot of the optical beam is located in the vicinity of the information plane when the differentiated signal level is negative.

4. The optical disk apparatus according to claim 1, wherein the light receiving area of the optical detection section is divided into inside and outside areas in accordance with a specified diameter of the optical beam, and the plane vicinity detecting section is operable to detect a signal corresponding to the amount of the light received at the outside light receiving area of the optical detection section.

5. The optical disk apparatus according to claim 1, wherein the light receiving area of the optical detection section is divided into inside and outside areas in accordance with a specified diameter of the optical beam, and the plane vicinity detecting section is operable to detect a signal corresponding to a sum of the amount of the light received at the inside light receiving area and the amount of the light received at the outside light receiving area of the optical detection section.

6. The optical disk apparatus according to claim 1, further comprising:
- a face-runout storage section operable to store an amount of face-runout corresponding to the rotating phase of the information medium and generate a driving output in accordance with the stored face-runout amount; and
- a face-runout signal applying section operable to add the signal from the face-runout storage section to the signal from the focus control driving section;
- wherein the focus pull in section is operable to select and output either of the signal from the face-runout signal applying section or the signal from the search driving section to the focus moving section in accordance with the signal from the focus error detecting section.

7. The optical disk apparatus according to claim 6, wherein the focus pull in section is actuated when the search driving section generates the driving signal for separating the beam spot of the optical beam from the information medium.

8. An optical head comprising:
- a converging section operable to converge an optical beam to irradiate the converged beam onto a rotating information medium which has at least one information plane;
- a focus moving section operable to move the converging section in a direction normal to the information plane of the information medium;
- an optical detection section having a light receiving area divided substantially concentrically into plural areas, the optical detection section being operable to receive a reflected light from the information medium and output a signal corresponding to an amount of the reflected light; and
- a plane vicinity detecting section operable to generate a vicinity detection signal based on the signal from the optical detection section, the vicinity detection signal continuously varying so as to have one maximum point while a beam spot of the optical beam moves from the surface to the information plane of the information medium,
- wherein the plane vicinity detecting section is operable to output a signal which is a sum of signals from all the divided areas of the optical detection section.

* * * * *